Nov. 19, 1968  E. Q. MEAD ET AL  3,412,301
PLURAL-MOTOR CONTROL SYSTEM FOR A COMMON LOAD WITH INDIVIDUAL
LOAD SHARING CONTROLS AND DECOUPLING OF A MOTOR
FOR INDEPENDENT OPERATION
Filed Jan. 6, 1965  7 Sheets-Sheet 1
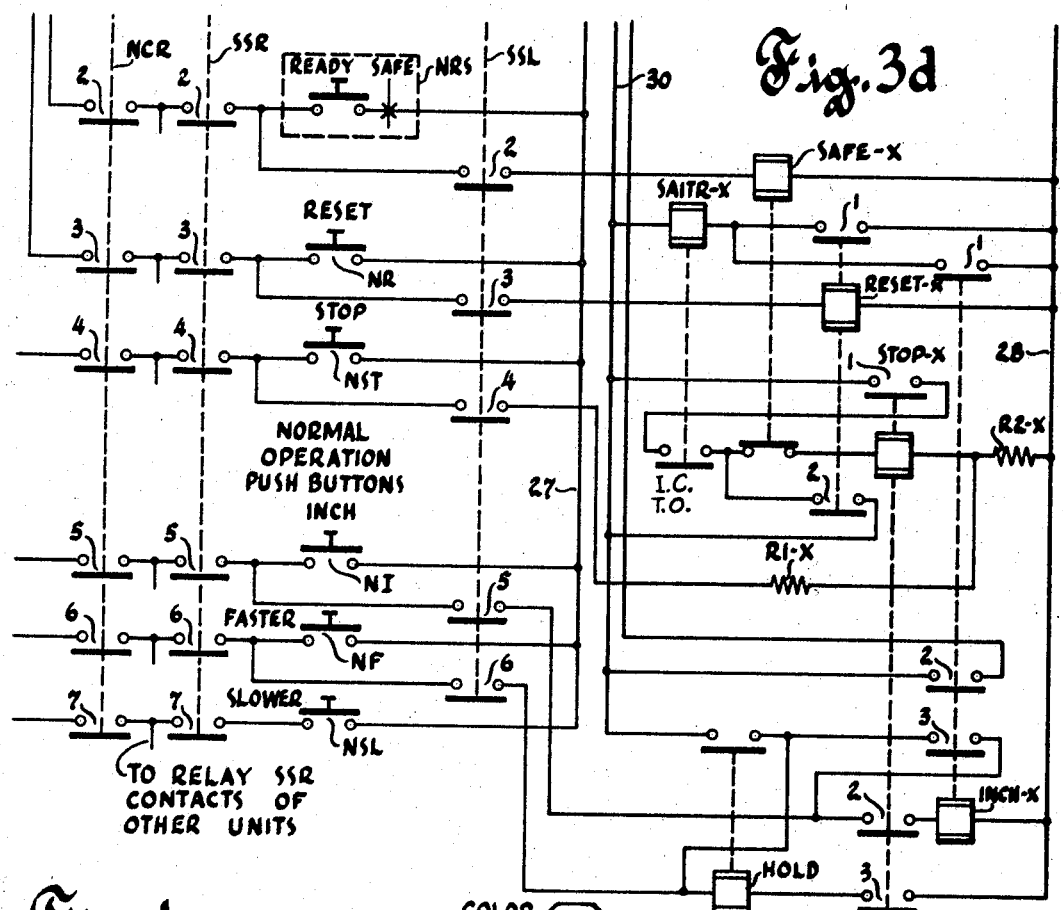

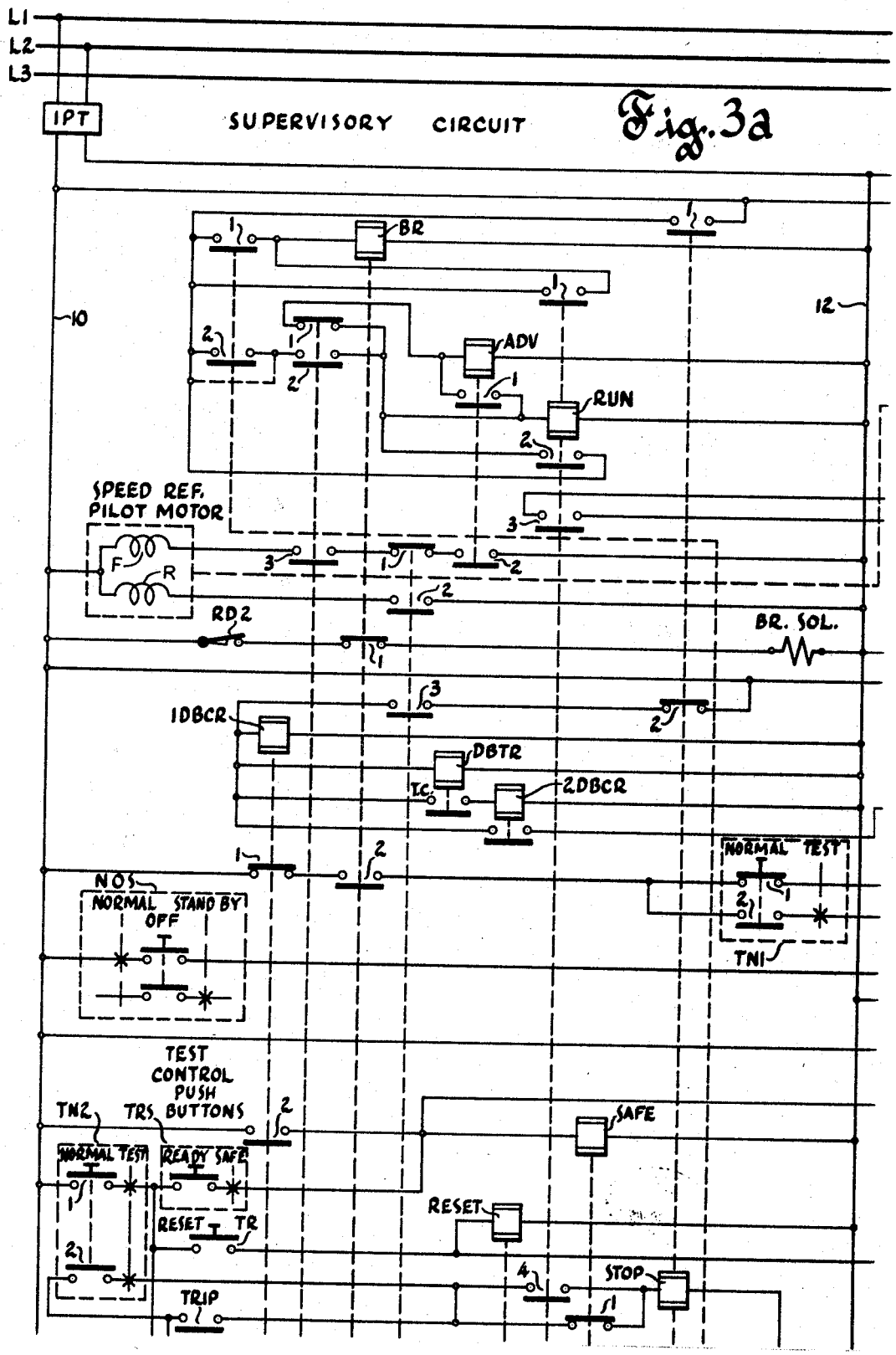

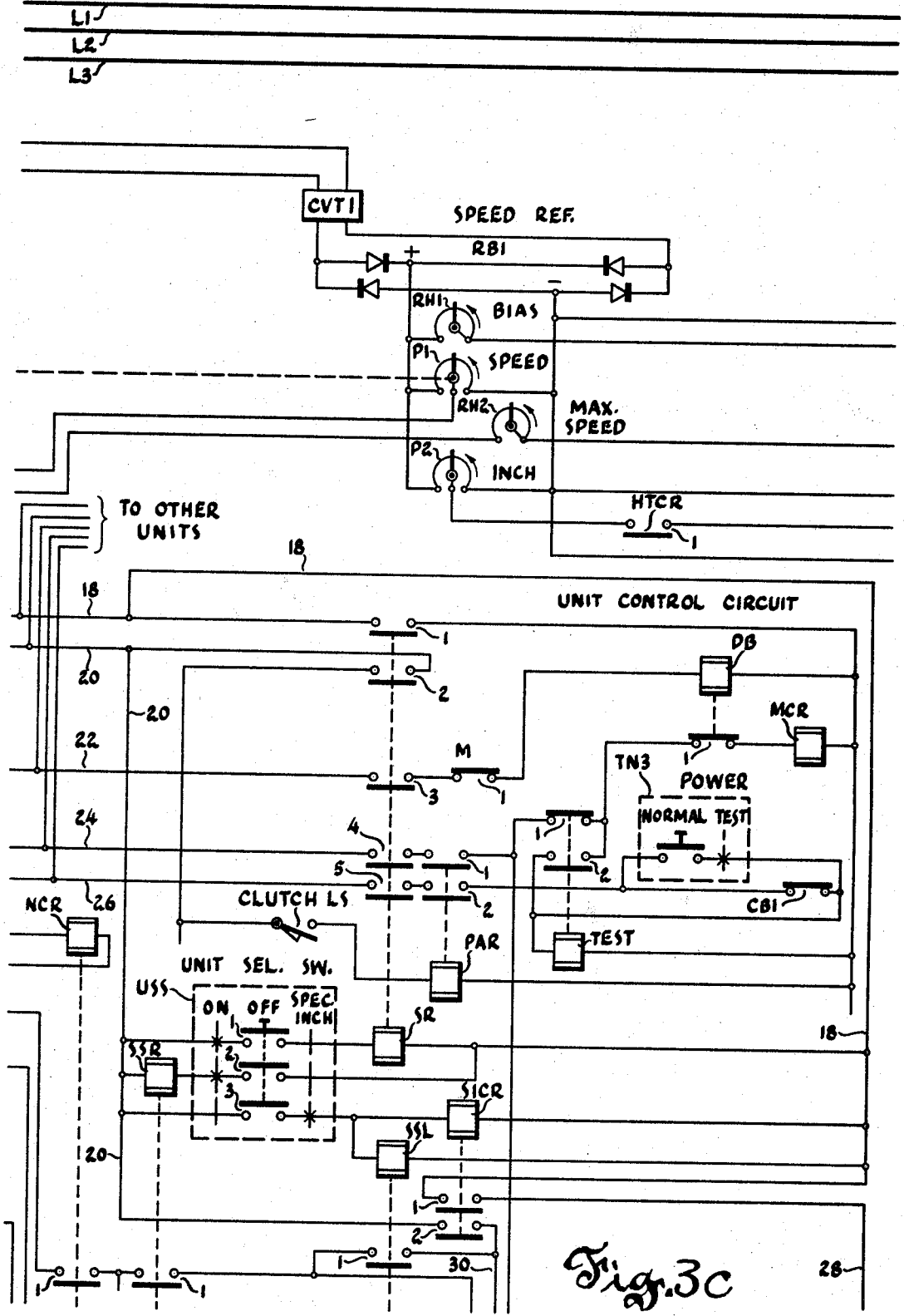

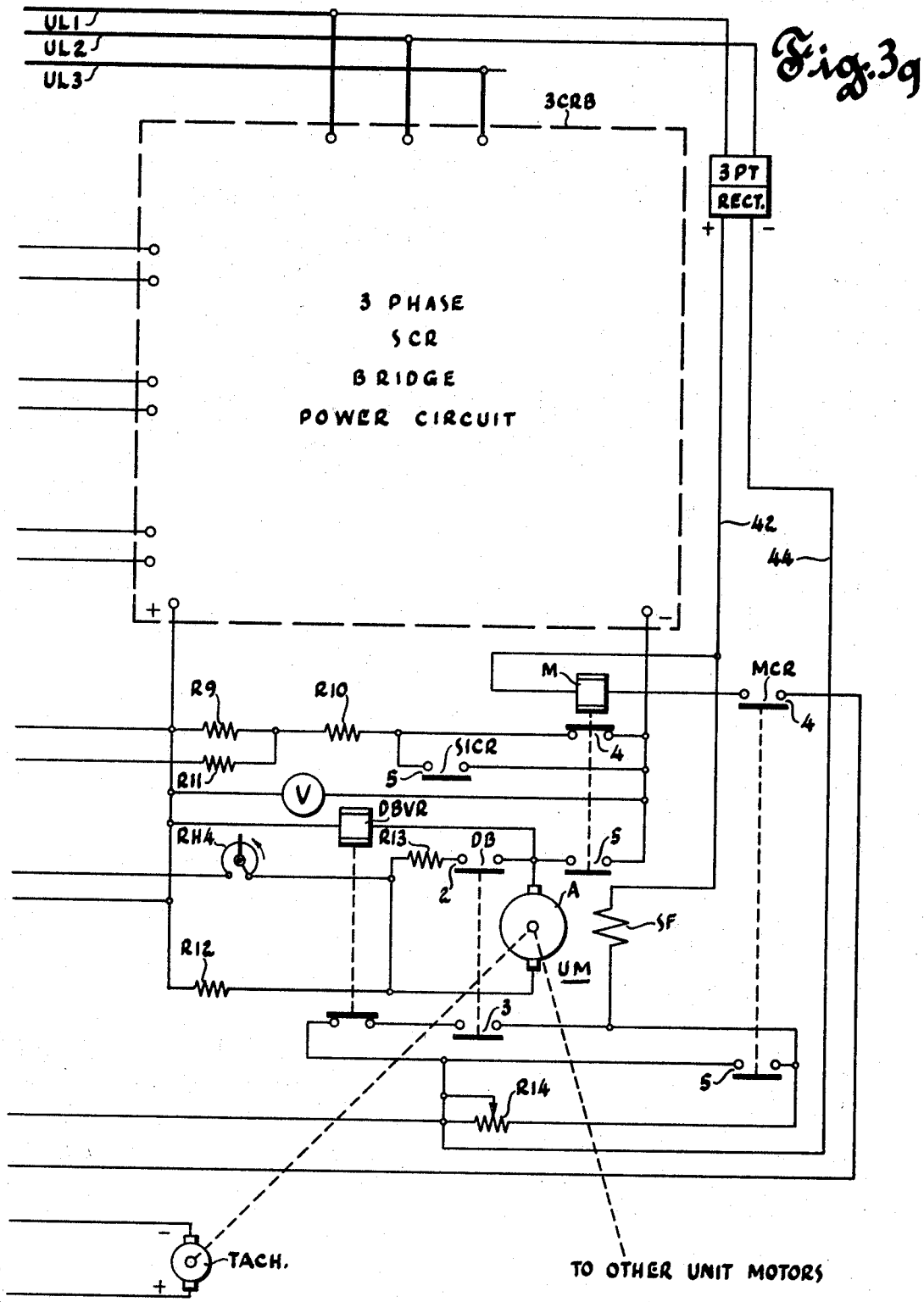

United States Patent Office 3,412,301
Patented Nov. 19, 1968

3,412,301
PLURAL-MOTOR CONTROL SYSTEM FOR A COMMON LOAD WITH INDIVIDUAL LOAD SHARING CONTROLS AND DECOUPLING OF A MOTOR FOR INDEPENDENT OPERATION
Edward Q. Mead and Leroy C. Gall, Milwaukee, Donald J. Greening, Thiensville, and Roger J. Hayes, Waukesha, Wis., assignors to Cutler-Hammer, Inc., Milwaukee, Wis., a corporation of Wisconsin
Filed Jan. 6, 1965, Ser. No. 423,662
18 Claims. (Cl. 318—99)

ABSTRACT OF THE DISCLOSURE

A plural-motor control system for controlling load sharing of a plurality of motors driving press units of a printing press coupled together. Preselected load sharing between the motors is maintained by individual current feedback regulation without interconnecting circuits between the load sharing control circuits of the motors. A motor can be decoupled for independent operation without disturbing the remainder of the system. System improvements include circuit arrangements for testing of the controller or controlled power output without running the motors, use of a minimum number of common control components, maintaining the current reference limit constant or setting it variable as a function of drive speed setting, current regulation control having very fast response to variation in motor load, and maintaining a preset load division when the number of motors in use is changed.

---

This invention relates to plural-motor control systems and more particularly to a system for controlling and regulating a plurality of direct current motors which may be coupled to a common driven device and having provision for decoupling a motor for independent operation.

While not limited thereto, the invention is especially applicable to plural-unit printing presses for controlling the motors that drive the press units and folder.

An object of the invention is to provide an improved plural-motor control system.

A more specific object of the invention is to provide improved means for controlling and regulating a plurality of direct current motors adapted for driving a common driven device.

Another specific object of the invention is to provide an improved plural-motor control system for a plural-unit printing press which avoids any electrical control connections between the press control units, having only electrical power supply connections, and electrical control connections from a common supervisory circuit to the several press unit motor control circuits.

Another specific object of the invention is to provide an improved plural-motor control system of the aforementioned type with improved means for isolating one motor for independent operation.

Another specific object of the invention is to provide in a control system for a plurality of direct current motors adapted to be coupled to a common driven device, means individual to each motor for applying motor current feedback to the respective motor control circuit, and such feedback being adjustable to afford balancing of the currents in all the motors.

Another object of the invention is to provide, in a system of the aforementioned type wherein each unit has individual current feedback for preset load division maintenance, improved means for obtaining current limit protection by limiting the amount of current reference signal that can be applied to the unit motor current regulator circuits.

Another specific object of the invention is to provide improved means for regulating the speed of the entire system independent of the number of motors connected to the load within the torque capabilities of the motors as determined by the current limit setting.

Another specific object of the invention is to provide an improved control system for a plurality of direct current motors having means enabling testing of the controller or testing the controlled power output without running the motors.

Another object of the invention is to provide a plural-unit printing press control system wherein the number of control components used in common to the press units is reduced to a minimum.

Another specific object of the invention is to provide, in a system of the aforementioned type wherein each unit has individual current feedback for preset load division maintenance, improved means for obtaining current limit protection by limiting the amount of current reference that can be applied to the unit motor current regulator control circuits, wherein the maximum value of said limited current reference can be held constant or, if desired, varied as a function of drive speed setting in order to provide tapering of maximum motor current with respect to drive speed.

Another object of the invention is to provide a plural-motor control system with improved current regulating control means having very fast response to variation in motor load.

Another object of the invention is to provide a plural-motor control system with improved means for maintaining a preset proportionate load division among the motors which requires no interconnecting circuits between the load sharing control circuits of the motors.

Another object of the invention is to provide a plural-motor control system with improved means for maintaining a preset proportional load division among the motors when the number thereof in use is changed and which has no component common to the entire load sharing system whereby failure of a single component will not put the entire system out of service.

Other objects and advantages of the invention will hereinafter appear.

These and other objects and advantages of the invention and the manner of obtaining them will best be understood by reference to the following detailed description of a specific embodiment of the invention taken in conjunction with the accompanying drawings, wherein:

FIGURE 1 is a schematic illustration of a plural-unit printing press to which the invention may be applied.

FIG. 2 is a block diagram of a plural-motor control system showing the general arrangement thereof;

FIGS. 3a–3g show a circuit diagram of the system of FIG. 2; and

Figure 3B:
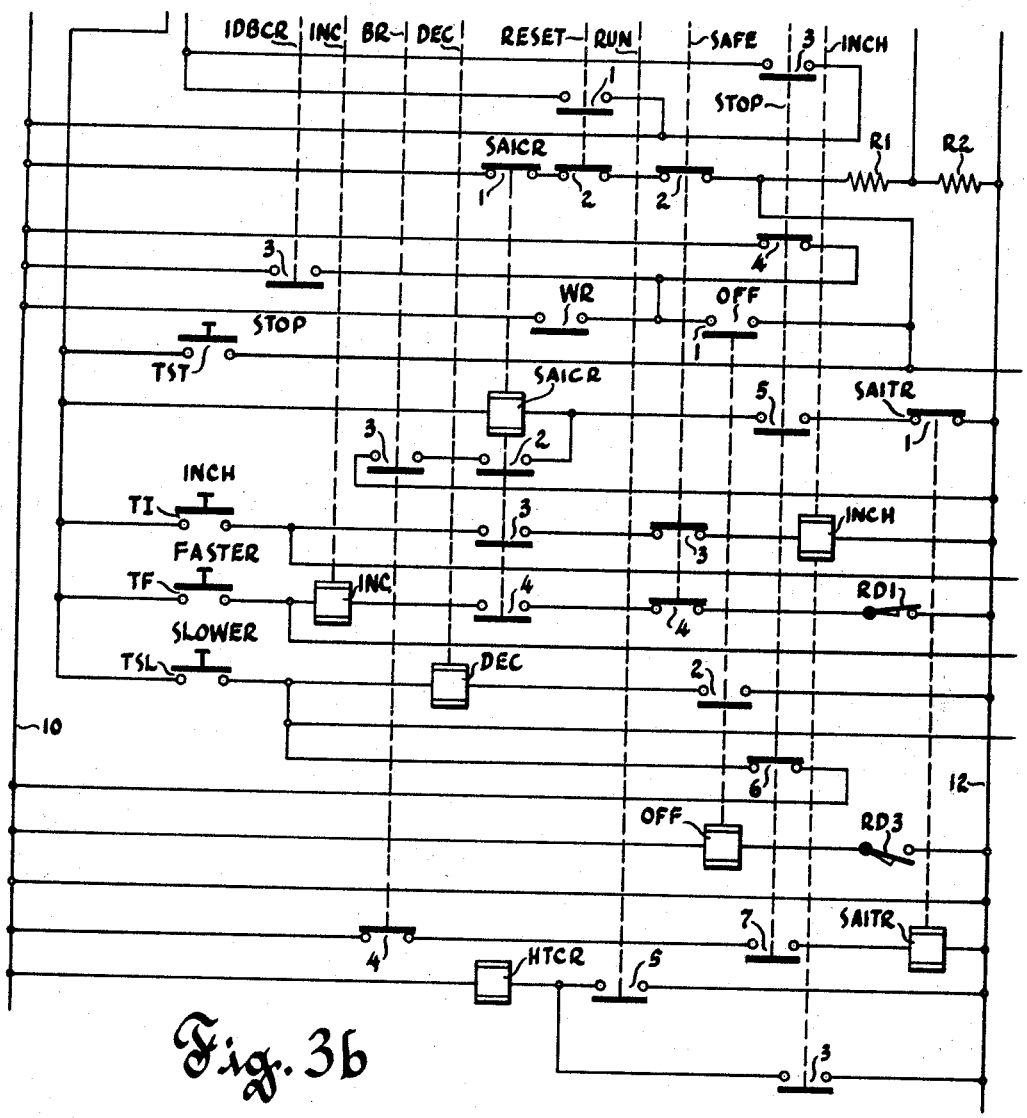

Referring to FIG. 1, there is shown a printing press having six press units 7 through 12, a color deck unit as a seventh unit and a folder. Press units 7, 8 and 9 are to the right of the folder and press units 10, 11 and 12 are to the left of the folder. The color deck unit is shown as mounted in a raised position to the right of the folder or on a higher deck from which it gets its name. The press units and folder are each provided with a direct current motor and the press units are additionally provided with a clutch as depicted schematically in FIG. 1. The folder motor shaft is connected to a mechanical brake and is also connected to a tachometer generator for providing a feedback signal indicative of the speed of the motors.

As shown in FIG. 1, the shaft extending in the right-hand direction from the folder motor is provided with a clutch F–9 for coupling the motor of press unit 9 thereto.

The shaft extending to the right from the motor of press unit 9 is provided with a clutch 9–8 for coupling the motor of press unit 8 thereto. And the shaft extending to the right from the motor of press unit 8 is provided with a clutch 8–7 for coupling the motor of press unit 7 thereto.

In a similar manner, the shaft extending from the folder motor to the left beyond the brake and tach is provided with a clutch 10–F for coupling the motor of press unit 10 thereto. The shaft extending from the motor of press unit 10 to the left is provided with a clutch 11–10 for coupling the motor of press unit 11 thereto. And the shaft extending from the motor of press unit 11 to the left is provided with a clutch 12–11 for coupling the motor of press unit 12 thereto.

As shown in FIG. 1, a clutch CD is provided for coupling the motor shaft of the color deck press unit to the shaft extending to the left from the motor of press unit 9.

It will be apparent from the foregoing that any number of press units can be clutched to the folder on each side thereof and that when press unit 9 has been clutched to the folder, the color deck press unit can also be clutched thereof.

Referring to FIG. 2, there is shown a block diagram of the press control system shown in detail in FIGS. 3a to 3g. This block diagram shows the control circuits which are common to the folder and all the press units but shows the control circuits which are individual to the folder and press units for only one thereof. Suitable multiple lines are shown to indicate connections to other press units.

As shown in FIG. 2, a supervisory circuit, a speed reference circuit, a magnetic firing circuit amplifier MFC or speed regulator, a tachometer and a current taper signal generator CTSG are common to the folder and all of the press units. The folder and each press unit is individually provided with a unit control circuit, a mixer amplifier MX, a firing circuit, a power circuit, a unit field supply and a unit motor. As indicated schematically in FIG. 2, the supervisory circuit controls the speed reference circuit which controls the magnetic firing circuit and the current taper signal generator CTSG. The current reference signal developed by the magnetic firing circuit and the current tape signal are applied in common to the mixer amplifiers of all the press units and the folder. A motor speed signal is fed back from the tachometer to the magnetic firing circuit amplifier to regulate the current reference signal going to all the press units and the folder.

Control signals are applied from the supervisor circuit in common to all of the unit control circuits. As depicted in FIG. 2, each unit control circuit provides output control signals to the respective mixer amplifier and the respective power circuit associated therewith. A motor current signal is fed back from the motor circuit of each press unit and folder to the respective mixer amplifier to regulate or balance the loads of the motors. When each motor is individually current regulated, a unique current limiting action can be realized by merely limiting the amount of current reference that can be applied to the unit motor current regulator control circuits, wherein the maximum value of such limited current reference can be held constant or, if desired, varied as a function of drive speed setting in order to provide "tapering" of maximum motor current with respect to drive speed. In this case, the current reference signal is limited when magnetic firing circuit amplifier MFC saturates. And the maximum value of the limited current reference may be held constant or varied by current taper signal generator CTSG controlled by the speed reference circuit and which controls all of the mixer amplifiers to afford the desired characteristic. Device CTSG may be any device such as a signal or function generator or adjustable resistor which applies a signal proportional to the speed reference signal into each unit current regulator MX to act as an additional current reference proportional to speed setting. And each motor has a shaft which may be clutched to another motor or to the folder as the case may be as described in connection with FIG. 1.

FIGS. 3a through 3g show the system of FIG. 2 in detail when assembled so that FIG. 3b is below FIG. 3a, FIG. 3c is to the right of FIG. 3a, FIG. 3d is below FIG. 3c and FIGS. 3e, 3f and 3g are to the right of FIG. 3c in that sequence.

The control system is powered from three-phase power supply lines L1, L2 and L3 extending horizontally along the uper portions of FIGS. 3a, 3c, 3e, 3f and 3g.

Figure 3E:
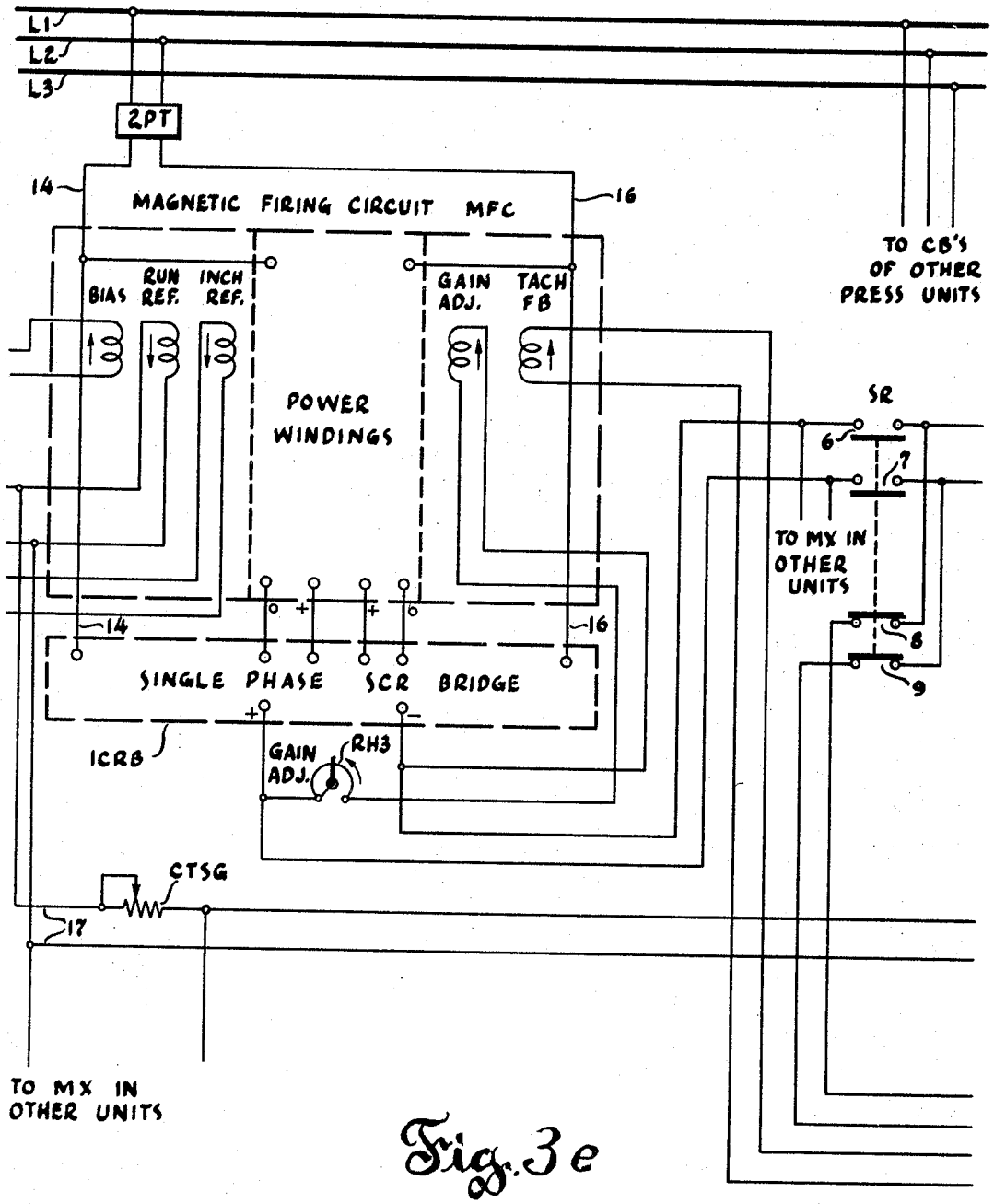

The supervisory circuit shown in the left-hand portion of FIG. 2 is shown in detail in FIGS. 3a and 3b and extends a small amount into FIGS. 3c and 3d. The speed reference circuit is shown at the upper portion of FIG. 3c. The magnetic firing circuit and current taper signal generator circuits are shown in FIG. 3e. The tach is shown at the lower portion of FIG. 3g. The aforementioned circuits are common to the several press units and folder and reduce the common components to a minimum for high dependability.

Figure 3F:
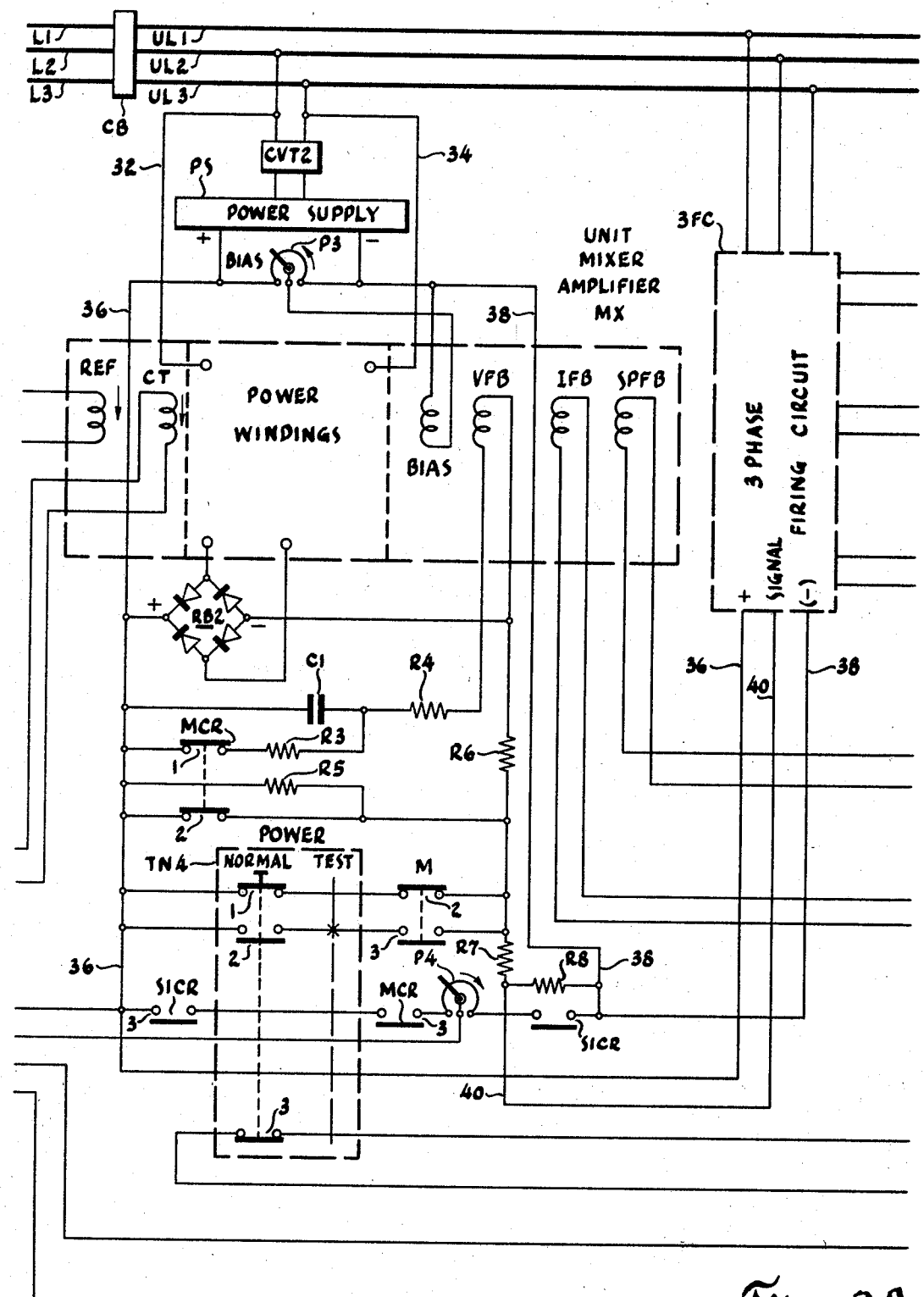

The unit control circuit shown in block form in FIG. 2 is shown in detail at the midportion of FIG. 3c. This unit control circuit may include, if desired, a special inch circuit shown at the lower portion of FIG. 3c and in FIG. 3d. The unit mixer amplifier circuit is shown in FIG. 3f. The firing circuit for the power circuit is shown at the right-hand portion of FIG. 3f. And the power circuit for the motor is shown in FIG. 3g.

The supervisory circuit in FIGS. 3a and 3b is supplied from lines L1 and L2 through a power transformer 1PT and supply conductors 10 and 12 and comprises a normal-off-standby switch NOS for setting from off position to either normal operating position or to standby position. The standby position is for emergency operation of the press in the event of damage to the normal operation apparatus. Since the standby apparatus is known, it has been omitted to avoid complicating the drawings. Primarily it consists of a set of standby pushbuttons which are connected to the system by conductors running through a separate conduit which may not have been damaged by the same event which damaged the normal control wiring. Switch NOS operates a normal control relay NCR at the lower portion of FIG. 3c.

The supervisory circuit also comprises test-normal switches TN1 and TN2 for switching the system from normal operating condition to a condition for testing controller operation without energizing the unit motor control circuits. A safe relay is provided for placing the controller in a safe condition so that it cannot be started if it is stopped and cannot be increased in speed if it is running. A reset relay is provided for energizing a stop relay which is required to permit operation of the press. An inch relay is provided for operating a control relay HTCR to enable operation of the press at inching speed. An increase speed relay INC is provided for energizing a run relay to set the system for threading speed. An advance relay ADV is provided for operation by relay INC to allow increasing the speed to running speed. An OFF relay is provided to prevent automatic restarting of the press following a power failure. A safe-after-inch timer SAITR and a safe-after-inch control relay SAICR are provided for placing the system in safe condition after a short timed interval if the press is not started after it has been reset. A decrease speed relay DEC is provided for decreasing the speed of the press.

In addition the supervisory circuit is provided with a brake relay BR for controlling a mechanical brake solenoid BR SOL. First and second dynamic braking control relays 1DBCR and 2DBCR and a dynamic braking timer DBTR are provided for controlling dynamic braking under emergency stopping conditions. A set of test control pushbuttons are provided for controlling the system for controller test. These test control pushbuttons include a test ready-safe switch TRS and a reset switch TR shown at the lower left-hand portion of FIG. 3a and a stop switch TST, an inch switch TI, a faster switch TF and a slower switch TSL shown at the left-hand portion of FIG. 3b. Limit switches RD1, RD2 and RD3 are provided in the supervisory circuit for locking out speed increase at full speed as shown by the cam layout development in FIG. 4, for applying the mechanical brake at low speed and for controlling the OFF relay as soon as the speed reference device is moved off its zero position. A reversible speed reference pilot motor shown in FIG. 3a is provided for driving speed reference potentiometer P1 in FIG. 3c as depicted by the broken line and for operating limit switches RD1, RD2 and RD3.

The speed reference circuit in the upper portion of FIG. 3c is supplied from power transformer 1PT in FIG. 3a through a constant voltage transformer CVT1 and a rectifier bridge RB1. In addition to speed reference potentiometer P1, this circuit comprises a bias adjusting rheostat RH1, a maximum speed rheostat RH2 and an inch reference potentiometer P2.

The magnetic firing circuit MFC in FIG. 3e is supplied from lines L1 and L2 through a power transformer 2PT and supply conductors 14 and 16. These supply conductors are connected to the power windings depicted by a broken line rectangle to provide 180 degree phase-displaced firing pulses at two pairs of output terminals. Since the power windings connections for magnetic firing circuits are known, the details thereof have not been shown to avoid complicating the drawings. Essentially, the magnetic firing circuit is a magnetic amplifier which is constructed so that it saturates in response to a predetermined input thereto to limit the amount of current reference that it can apply to current regulator amplifiers MX and to afford the motors current limit protection. A single phase silicon controlled rectifier (SCR) bridge 1CRB having two SCR's and two diodes is also supplied with alternating current from supply conductors 14 and 16. The phase-displaced output pulses from the two pairs of output terminals of firing circuit MFC are applied to the gate-cathode circuits of the SCR's in the bridge and are synchronized with their anode voltages such that each firing pulse is applied during a positive anode voltage half-cycle of the corresponding SCR to render the same conducting. The phase of the firing pulses may be adjusted relative to the associated positive anode voltage half-cycle by suitable energization of the control windings of the magnetic firing circuit thereby to adjust the direct current output of bridge 1CRB.

As shown in FIG. 3e, the magnetic firing circuit is provided with a bias winding adjustably energizable from bridge RB1 in FIG. 3c through rheostat RH1 to bias the magnetic firing circuit to cutoff. The magnetic firing circuit has a run reference winding energized through maximum speed adjusting rheostat RH2 and run relay contact 3 in series therewith across the adjustable tap and one side of speed reference potentiometer P1. The magnetic firing circuit is provided with an inch reference winding energized across the movable tap and one side of potentiometer P2 through control relay HTCR contact 1. The magnetic firing circuit is also provided with a gain adjusting winding connected through a gain adjusting rheostat RH3 across the output of single-phase controlled rectifier bridge 1CRB. The gain adjusting winding provides a negative voltage feedback which may be adjusted at the rheostat. The magnetic firing circuit is further provided with a speed feedback or tach feedback winding connected across the armature winding of the tachometer generator in FIG. 3g. As indicated by the arrows adjacent the windings, the inch reference and run reference windings turn the magnetic firing circuit on whereas the bias winding, gain adjusting winding and tach feedback winding tend to turn the magnetic firing circuit toward off to control and regulate its output.

As shown in FIG. 3e, means is provided for deriving a signal proportional to the speed reference and having this signal by-pass the magnetic firing circuit and for applying this signal into each unit current regulator amplifier MX to act as an additional current reference proportional to the speed setting. For this purpose, a pair of conductors 17 are connected to the output of speed reference potentiometer P1 in parallel with the run reference winding of the magnetic firing circuit. These conductors are connected across a current taper winding CT in unit mixer amplifier MX, there being a current taper signal generator device CTSG shown as an adjustable resistor connected in series in this connection for adjusting the signal going to the current taper winding. As indicated by the conductor multiples at the left-hand portion of FIG. 3e, similar speed reference connections are made to the other units to apply current reference taper signals thereto.

The supervisory circuit, speed reference circuit and magnetic firing circuit and its associated single-phase SCR bridge, the tach and current taper control connection hereinbefore described are common to the press unit circuits and folder circuit. As shown in FIG. 3c, five conductors 18, 20, 22, 24 and 26 connect the supervisory circuit to a unit control circuit and as indicated by the conductor multiples thereat, these conductors leaving the supervisory circuit are also connected to the unit control circuits of all the other press units and the folder. As indicated by the conductor multiples adjacent contacts 1–7 of relay NCR at the lower left-hand portion of FIG. 3c and the left-hand side of FIG. 3d, connections may be made to additional sets of pushbuttons through SSR relay contacts of other press units. As indicated in FIG. 3f, supply lines L1, L2 and L3 are connected through a circuit breaker CB to unit supply lines UL1, UL2 and UL3. As indicated in FIG. 3e, lines L1, L2 and L3 are multiple-connected to circuit breakers of other press units and folder. As also indicated in FIG. 3e, the output conductors of bridge 1CRB are multiple-connected to speed reference windings of mixer amplifiers in the other units and folder through similar SR relay contacts individual thereto.

The control circuits individual to one press unit will now be described, it being understood that the common control circuits in FIGS. 3c, 3d, 3e and 3f are connectable to the control circuits individual to the other units and folder by the circuit multiples just described.

The unit control circuit in FIG. 3c is provided with a unit selector switch USS for turning the unit on or off. The unit selector switch of each unit and folder is provided with an on and off position. The unit selector switch of the color deck unit or any other unit, if desired, may be provided in addition to on and off positions, with a special inch position and a special inch circuit to afford inching operation of such unit independently of the other units and folder. The unit control circuit is provided with relays SR and SSR controlled by the unit selector switch for connecting the unit control circuit to conductors 18, 20, 22, 24 and 26 and for connecting the set of normal operation pushbuttons shown in FIG. 3d to the supervisory circuit through conductor 27. The unit control circuit in FIG. 3c is also provided with a dynamic braking contactor DB, a main control relay MCR, a test-normal switch TN3 for performing a power test, a TEST relay, and a setup relay PAR. Each unit except the folder is also provided with a clutch limit switch LS in the circuit of the associated relay PAR. In the folder control circuit, relay PAR is connected to contact 2 of relay SR. An interlock contact CB1 of circuit breaker CB is connected in the test relay circuit in shunt of switch TN3 to allow operation of the test relay under controller test when the circuit breaker is open.

The special inch circuit at the lower portion of FIG. 3c and in FIG. 3d comprises special inch control relay SICR controlled by switch USS for connecting supply conductors 18 and 20 to conductors 28 and 30, respectively, to supply voltage to the special inch circuit. The special high circuit is provided with a connection relay SSL controlled by the unit selector switch for connecting the set of normal operation pushbuttons to the special inch circuit. The set of normal operation pushbuttons which may be connected to control either the supervisory circuit or the special inch circuit includes a normal ready-safe switch NRS, a reset switch NR, a stop switch NST, an inch switch NI, a faster switch NF and a slower NSL.

The special inch circuit also comprises a safe relay SAFE-X, a safe-after-inch timer SAITR-X, a reset relay RESET-X, a stop relay STOP-X, an inch relay INCH-X and a hold inch relay HOLD. These special inch relays except the hold relay are indicated by an X to distinguish them from corresponding relays in the supervisory circuit which perform similar functions. The hold relay is provided to maintain the inch operation without having to hold the inch button down.

The unit mixer amplifier circuit MX in FIG. 3f is supplied with power from lines UL2 and UL3 through conductors 32 and 34 to the power windings to provide controlled A.C. from the pair of output terminals to a rectifier bridge RB2. Since the power windings connections for magnetic amplifiers of this type are known, the details thereof have not been shown to avoid complicating the drawings. Power is also supplied from lines UL2 and UL3 through a constant voltage transformer CVT2 to a direct current power supply circuit PS which has its output connected to conductors 36 and 38 and therethrough to the positive and negative supply input terminals of the three-phase firing circuit.

As will be apparent, the reference winding of the mixer amplifier receives an input signal from the controlled output of bridge 1CRB in FIG. 3e through contacts of relay SR. A current taper winding CT receives a signal proportional to the speed setting through variable resistor CTSG and conductors 17 from the speed reference potentiometer. A bias winding of the mixer amplifier is connected to the movable tap and one side of a potentiometer P3 which is supplied from conductors 36 and 38. The mixer amplifier is provided with a voltage feedback winding VFB connected to the output terminals of bridge RB2 through contact 1 of relay MCR and resistors R3 and R4, there being a capacitor C1 connected across contact 1 of relay MCR and resistor R3. The positive terminal of bridge RB2 is connected through resistors R5 and R6 to the negative terminal thereof, there being a contact 2 of relay MCR connected across resistor R5. The direct current output from the mixer amplifier is connected from the positive terminal of bridge RB2 to positive supply conductor 36 and from the negative terminal of bridge RB2 through resistors R6 and R7 in series and conductor 40 to the signal input terminal of three-phase firing circuit 3FC. A resistor R8 is connected between conductors 38 and 40. A normal-test switch TN4 is provided at the mixer amplifier output in FIG. 3f for shunting the amplifier output under certain conditions of stopping and for interrupting the main contact or circuit under test conditions so that the motor armature will not be energized.

An alternative energizing circuit for the reference winding of the mixer amplifier is provided from the movable tap and one side of a potentiometer P4 in FIG. 3f through contacts of relay SR in FIG. 3e, this potentiometer being connectable across supply conductors 36 and 38 under the control of main control relay MCR and special inch control relay SICR. This potentiometer P4 affords manual control of energization of the mixer amplifier reference winding at a time when the magnetic firing circuit is not being operated.

Mixer amplifier MX is further provided with a current feedback winding IFB adjustably energized in proportion to the unit motor current and a special feedback winding SPFB energizable from the output of the power bridge circuit under power test and special inch conditions.

Three-phase firing circuit 3FC is supplied with direct current operating voltage from conductors 36 and 38 and is supplied with an input signal voltage from conductor 40 as aforesaid. This firing circuit is also supplied with three-phase alternating current from lines UL1, UL2 and UL3 to synchronize its output pulses with the positive anode voltage periods of the SCR's in three-phase SCR bridge power circuit 3CBRB. For this purpose, firing circuit 3FC is provided with three pairs of output conductors connecting its outputs to the power circuit 3CRB. This power circuit is supplied from lines UL1, UL2 and UL3 and is controlled by its firing circuit 3FC to provide a controllable direct current at its positive and negative output terminals. Three-phase firing circuit 3FC has been shown schematically to avoid complicating the drawing and reference may be had to R. W. Spink copending application Ser. No. 248,314, filed Dec. 31, 1962, now Patent No. 3,281,645, dated Oct. 25, 1966, and assigned to the assignee of this invention, for a detailed illustration and description thereof. The details of three-phase SCR bridge power circuit 3CRB also have not been shown to avoid complicating the drawing. Reference may be had to D. J. Greening and C. E. Smith copending application Ser. No. 420,332, filed Dec. 22, 1964, now Patent No. 3,332,000, dated July 18, 1967, and assigned to the assignee of this invention, for a detailed illustration and description thereof.

A voltage divider including resistors R9 and R10 in series is connected in series with a main contactor contact 4 across the output terminals of bridge power circuit 3CRB and the special feedback winding of the unit mixer amplifier is connected across resistor R9 in series with a resistor R11. A contact 5 of special inch control relay SICR is connected across the main contactor contact 4 to afford use of the special feedback winding when the main contactor is not energized.

Armature winding A of unit motor UM is connectable via a main contactor contact 5 across the output of the bridge power circuit in series with a resistor R12 which provides a motor current feedback signal. For this purpose, current feedback winding IFB of the unit mixer amplifier MX is connected in series with a balancing rheostat RH4 across resistor R12. The arrows at the rheostats and potentiometers indicate increase direction.

A voltmeter V is connected across the direct current output terminals of the bridge power circuit for indicating the output voltage under power test conditions when the motor is not run and for indicating the applied motor voltage during normal operation. A dynamic braking voltage relay DBVR is connected across armature A and resistor R12 for providing a more linear dynamic braking effect when the motor slows down.

Shunt field winding SF of the unit motor is supplied from lines UL1 and UL2 through a power transformer 3PT and rectifier circuit RECT providing direct current through positive and negative conductors 42 and 44, respectively, and adjustable resistor R14 thereto. Main contactor M is connectable across conductors 42 and 44 through a contact 4 of relay MCR and contact 3 of switch TN4 in FIG. 3f. Resistor R14 may be shunted by a contact 5 of relay MCR or by a contact 3 of contactor DB and a contact of relay DBVR in series. A dynamic braking resistor R13 is connectable across armature A through a contact 2 of dynamic braking contactor DB.

The operation of the system of FIGS. 3a–3g will now be described.

To prepare the system for operation, a three-phase alternating current power source is connected to lines L1, L2 and L3 in FIG. 3a. This causes an operating voltage to be applied from lines L1 and L2 through power transformer 1PT across supply conductors 10 and 12 of the supervisory circuit of FIGS. 3a and 3b. This causes an operating voltage to be applied from transformer 1PT through constant voltage transformer CVT1 across rectifier bridge RB1 in FIG. 3c. This also causes an operating voltage to be applied from lines L1 and L2 through power transformer 2PT across supply conductors 14 and 16 of magnetic firing circuit MFC in FIG. 3e. In addition, if circuit breaker CB is closed, contact CB1 in FIG. 3c is opened and an operating voltage is applied from lines UL2 and UL3 in FIG. 3f across supply conductors 32 and 34 of unit mixer amplifier MX and through constant voltage transformer CVT2 to direct current power supply circuit PS, the output of the latter being connected across direct current supply conductors 36 and 38. Operating voltage is applied from lines UL1, UL2 and UL3 in FIG. 3f to three-phase firing circuit 3FC. Operating voltage is applied from supply lines UL1, UL2 and UL3 in FIG. 3g to three-phase controlled rectifier bridge 3CRB to supply the armature winding of the unit motor UM as hereinafter described. And operating voltage is applied from lines UL1 and UL2 through power transformer 3PT, rectifier RECT, conductors 42 and 44 and resistor R14 to the shunt field winding SF of the unit motor.

The aforesaid energization of rectifier bridge RB1 in FIG. 3c causes direct current flow from the positive output terminal thereof through rheostat RH1 and the bias winding of magnetic firing circuit MFC to the negative output terminal of the bridge. The power windings of the magnetic firing circuit are supplied with alternating current from supply conductors 14 and 16 but the bias winding when energized as aforesaid biases the magnetic firing circuit to cutoff. This cutoff bias can be adjusted at rheostat RH1. Supply conductors 14 and 16 also supply alternating voltage to single-phase silicon controlled rectifier bridge 1CRB. This controlled rectifier bridge is then controlled by the output direct currents of the magnetic firing circuit as hereinafter more fully described to energize the reference windings of the mixer amplifiers of all the press units being used.

Energization of direct current power supply circuit PS in FIG. 3f causes direct current to flow through the resistor of bias potentiometer P3. An adjustable portion of the voltage across potentiometer P3 is applied from the adjustable tap thereof to the bias winding of unit mixer amplifier MX. This bias winding biases the mixer amplifier to cutoff and the bias is adjusted at potentiometer P3. The direct current output of power supply circuit PS is also applied through supply conductors 36 and 38 to the positive and negative supply terminals, respectively, of three-phase firing circuits 3FC in FIG. 3f.

The positive and negative direct current output conductors of three-phase silicon controlled rectifier bridge 3CRB in FIG. 3g are connectable to supply armature A of the press unit motor. The direct current output conductors of rectifier RECT in FIG. 3g are connected to supply shunt field winding SF of the press unit motor in series with an adjustable resistor R14.

The clutches between the folder and the press units to be used are closed. For example, if press unit 9 is to be used, clutch F3–9 is closed, this clutch being on the press shaft between folder F3 and press unit 9. Closing of a clutch causes the associated clutch limit switch to be closed. For example, closing clutch CD for the color deck causes clutch limit switch LS in FIG. 3c to be closed.

To prepare the system for normal operation, the test-normal selector switches TN1 and TN2 in the supervisory circuit in FIGS. 3a and 3b and switches TN3 and TN4 in the unit control circuit and unit mixer amplifier circuit in FIGS. 3c and 3f, respectively, are placed in their NORMAL position as shown. The normal-off-standby selector switch NOS in FIG. 3a is placed in its NORMAL position to enable control of the press from the normal operation pushbuttons in FIG. 3d. The unit selector switches such as switch USS in FIG. 3c of all units between the folder and the press units to be used are placed in their ON position, these selector switches selecting the press units to be used.

Switch NOS in FIG. 3a in its NORMAL position energizes normal control NCR to close its contacts 1 through 7. These contacts of the normal control relay close points in the circuits of the normal operation pushbuttons.

Unit selector switch USS in its ON position energizes control setup relays SR and SSR. Relay SSR closes its contacts 1 through 7 to connect the normal operation pushbuttons through the contacts of relay NCR to the supervisory circuit. Relay SR closes its contacts 1 through 5. Contacts 1 and 2 of relay SR connect power from transformer 1PT and conductors 18 and 20 to the relays of the unit control circuit. Contact 3 of relay SR closes a point in the circuit of dynamic braking contactor DB. Contacts 4 and 5 of relay SR close points in the circuits of relays MCR and TEST. Relay SR also closes its contacts 6 and 7 at the right-hand portion of FIG. 3e to connect the output conductors of magnetic firing circuit MFC to the speed reference winding REF of mixer amplifier MX. In addition, relay SR opens its contacts 8 and 9 in FIG. 3e to disconnect the special inch control apparatus from the reference winding of amplifier MX.

The closure of clutch limit switch LS in FIG. 3c as aforementioned energizes setup relay PAR to close its contacts 1 and 2 in the circuits of relays MCR and TEST. Contact TRIP in FIG. 3a closes in known manner when the above conditions are set up.

When the aforementioned conditions have been established, the system is ready for running the press.

When the system is ready for running the press, operation can be temporarily prevented by placing normal operation ready-safe switch NRS in its SAFE position whereby to close its contact in FIG. 3d. This causes energization of relay SAFE in FIG. 3a to open its contacts 1 through 4. Contacts 1 and 2 prevent operation of relay STOP, contact 3 prevents operation of relay INCH and contact 4 of relay SAFE prevents operation of faster relay INC thereby to lock out the press unit motors from operation. This lockout is maintained until switch NRS is placed in its READY position, reopening its contact to deenergize relay SAFE.

INCHING

After the system has been switched from safe to ready condition, the reset switch must first be pressed to condition the system for inching. Pressing the reset switch NR in FIG. 3d to close its contacts completes a circuit through contacts 3 of relays NCR and SSR to energize relay RESET. The reset relay closes its contact 1 and opens its contact 2. Contact 2 interrupts the circuit through resistors R1 and R2 and contact 1 completes a circuit through contact TRIP, contact 1 of relay SAFE and resistor R2 to energize relay STOP. Energization of relay STOP causes closure of its contacts 1, 3, 5 and 7 and causes opening of its contacts 2, 4 and 6 in FIGS. 3a and 3b. Contact 1 of relay STOP closes a point in the circuit of relay BR, contact 2 opens a point in the circuits of the dynamic braking control relays, contact 3 closes a self-maintaining circuit in shunt of contact 1 of the reset relay, contact 4 opens a point in the circuit of resistors R1 and R2, contact 5 completes an energizing circuit for relay SAICR, contact 6 opens a point in the circuit of relay DEC and contact 7 completes an energizing circuit for timer SAITR.

Energization of relay SAICR as aforesaid causes opening of its contact 1 and closing of its contacts 2, 3 and 4. Contact 1 of this relay opens a point in series with contact 2 of the reset relay so that the reset pushbutton switch can now be released to allow it to reopen and deenergize the reset relay. Contact 2 of relay SAICR completes a point in a maintaining circuit which will become effective provided the INCH button is pressed within a predetermined time interval of about three seconds. Contact 3 of relay SAICR closes a point in the circuit of the inch relay and contact 4 closes a point to permit energization of speed increase relay INC.

Energization of timer SAITR as aforesaid provides a time interval before the elapse of which the INCH button must be pressed. If the inch button is not pressed during such time interval, the system will be restored so that the reset button must again be pressed before the press can be operated. For this purpose, energization of timer SAITR starts it operating to time an interval of three seconds. Relay STOP is actually provided with additional contacts to operate an audible signal until the inch button is pressed to indicate that the press is about to be operated. If the inch button is not pressed within the allotted time interval, timer SAITR times out and opens its contact 1 to deenergize relay SAICR. Such deenergization causes reopening of contacts 2, 3, and 4 in the maintaining circuit of relay SAICR and in the circuits of relays INCH and INC, respectively, and causes reclosure of contact 1 to restore relay STOP. As will be apparent, this contact 1 completes a circuit through contacts 2 of the reset and safe relays and resistor R1 in shunt of the operating coil of relay STOP. Connection of resistor R1 across the operating coil of the stop relay reduces the voltage to such a low value that the relay restores. The system now has been restored to a condition wherein the reset button must again be pressed before the press can be started.

If the inch button is pressed before timer SAITR times out, closure of the inch switch contacts completes a circuit through contacts 5 of relays SSR and NCR and contacts 3 of relays SAICR and SAFE to energize relay INCH. This energization causes the inch relay to close its contacts 1 through 3. Contact 1 completes a circuit through contact 1 of the stop relay to energize relay BR, contact 2 closes a point in the circuit of relay RUN and contact 3 closes an energizing circuit for control relay HTCR. Relay BR closes its contacts 2 and 3 and opens its contacts 1 and 4. Assuming that the speed reference device is at or near its zero position according to the cam development of FIG. 4 so that limit switch RD2 in FIG. 3a is closed, opening of contact 1 of brake relay BR causes deenergization of brake solenoid BR SOL to release the brake. Closure of contact 2 of relay BR causes energization of main control relay MCR in a circuit extending through contact 1 of relay IDBCR, contact 1 of switch TN1, contact 4 of relay SR, contact 1 of relay PAR, contact 1 of relay TEST and contact 1 of contactor DB. Closure of contact 3 of relay BR completes a maintaining circuit for relay SAICR through contact 2 of the latter. This maintaining circuit is completed before timer SAITR times out thereby to prevent restoration of the stop relay. Opening of contact 4 of relay BR interrupts the circuit of timer SAITR to reset the latter and stop its timing function.

The aforesaid energization of control relay HTCR at the lower portion of FIG. 3b closes its contact 1 in FIG. 3c to connect inch speed control potentiometer P2 to the inch reference winding of magnetic firing circuit MFC. The aforesaid energization of main control relay MCR in FIG. 3c opens its contacts 1 and 2 in FIG. 3f. Contact 1 opens the resistive shunt across capacitor C1 in the circuit of voltage feedback winding VFB of unit mixer amplifier MX. Contact 2 opens the shunt across resistor R5 to insert this resistor across the output of bridge RB2. Contact 3 of relay MCR in FIG. 3f closes without effect at this time. In FIG. 3g, contacts 4 and 5 of relay MCR close. Contact 4 completes an energizing circuit for main contactor M through contact 3 of switch TN4 in FIG. 3f across direct current conductors 42 and 44 in FIG. 3g. Contact 5 of relay MCR shunts resistor R14 from the circuit to increase the energization of the shunt field of the press unit motor.

The aforesaid energization of main contactor M causes opening of its contacts 1, 2 and 4 and closing of its contacts 3 and 5. Contact 1 in FIG. 3c interrupts the circuit of dynamic braking contactor DB to prevent energization thereof. Contact 2 in FIG. 3f interrupts a shunt across the output of bridge RB2. Contact 3 closes a point in series with test contact 2 of switch TN4 without effect at this time. Contact 4 in FIG. 3g disconnects the load resistors R9 and R10 from the output of the power bridge to prevent energization of the special feedback winding of the mixer amplifier. And contact 5 of contactor M connects armature A and resistor R12 in series across the direct current output of the three-phase controlled power bridge 3CRB.

It will be apparent from the foregoing description that full field energization has been applied to the press unit motor and that the armature thereof has been connected to the controlled power bridge. Under these conditions, it is only necessary to operate the controlled power bridge to energize the armature winding in order to start the motor. For this purpose, the aforesaid energization of the inch reference winding of magnetic firing circuit MFC in FIG. 3e turns the magnetic firing circuit on so that it supplies firing pulses from its two pairs of output terminals to the gate-cathode circuits of the two silicon controlled rectifiers in single-phase controlled rectifier bridge 1CRB. As a result, bridge 1CRB provides a direct current output as a current reference signal or speed error signal to the reference winding of unit mixer amplifier MX and to similar reference windings in the other press units. The output signal from bridge 1CRB is also applied through rheostat RH3 in FIG. 3e as a negative feedback to the gain control winding of firing circuit MFC. It will be apparent that turning rheostat HR3 in the direction of the arrow increases the gain of the firing circuit by reducing the negative feedback and vice versa.

The aforesaid energization of the reference winding of unit mixer amplifier MX turns this amplifier on. In a similar manner, the mixer amplifiers in the other press units are turned on. Turning the mixer amplifier on causes it to provide A.C. output pulses to the input terminals of rectifier bridge RB2. The direct current output of bridge RB2 is smoothed by known means, not shown, and is applied through resistors R6 and R7 and conductors 36 and 40 across the positive and signal input terminals of three-phase firing circuit 3FC. The output of bridge RB2 is also applied through capacitor C1 and resistor R4 across voltage feedback winding VFB of the mixer amplifier to provide a stabilizing influence on the system. Resistor R5 provides a discharge path for capacitor C1 when the output of bridge RB2 is decreased.

The aforesaid input signal causes operation of three-phase firing circuit 3FC in proportion to the amplitude of such input signal to provide firing current pulses to the silicon controlled rectifiers in three-phase controlled rectifier bridge 3CRB. The connection from lines UL1, UL2 and UL3 to firing circuit 3FC synchronize its output firing pulses so that they are applied to the gate-cathode circuits during positive anode voltage periods of the three silicon controlled rectifiers in power bridge 3CRB. For a more detailed illustration and description of firing circuit 3FC and controlled bridge 3CRB, reference may be had to the aforementioned R. W. Spink copending patent application. Power bridge 3CRB provides a direct current from its positive and negative output terminals to energize the winding of armature A in series with resistor R12. Since both the shunt field and armature windings are now energized, the motor starts running and drives the press units. The motors of the other press units being used also start running. The press units run in unison since the motor shafts are clutched to one another as indicated by the broken line in FIG. 3g.

The running motors drive a direct current generator TACH through a shaft indicated by the broken line in FIG. 3g. The voltage generated in TACH causes a current to flow in the tach feedback winding of magnetic firing circuit MFC, or speed regulator. This signal fed back from the tachometer generator to the feedback winding of the magnetic firing circuit is proportional in amplitude to the speed of the press motors and stabilizes the operating speed of the press units. Since this speed feedback signal is fed back to the magnetic firing circuit which is common to all the press units, it will regulate the speeds of all the unit motors that are running.

Each press unit is provided with a torque feedback means individual thereto to afford load balance or maintenance of the preset proportionate load division between the motors of the press units. For this purpose, a signal proportional to armature current is fed from across resistor R12 in FIG. 3g through rheostat RH4 to current feedback winding IFB of mixer amplifier MX. This current signal feedback regulates the armature current of the motor and each motor current is regulated individually. Adjustment of this feedback at rheostat RH4 affords presetting of a desired load division between the motors.

The press unit motors continue to run at their inch speed as adjusted at potentiometer P2 as long as normal inch pushbutton NI is held down. When this pushbutton is released to allow it to reopen, the press units will stop. This will turn the audible alarm on again as by way of a normally closed contact of relay BR and will allow three seconds for reoperating the inch button or operating the stop button. If the inch button is reoperated, the inch operation of the press units as hereinbefore described will be repeated. If the stop button is pressed the audible signal will be turned off. If neither inch nor stop button is pressed in three seconds, the system will go into safe-after-inch condition as hereinbefore described, requiring pressing of the reset button before the press can be reoperated.

Referring to FIGS. 3b and 3d, it will be seen that releasing inch switch NI to allow it to reopen causes deenergization of relay INCH. Upon restoring the inch relay reopens contact 1 in FIG. 3a to deenergize relay BR, reopens contact 2 without effect at this time and reopens contact 3 to deenergize control relay HTCR. This control relay reopens its contact 1 in FIG. 3c to disconnect direct current from the inch reference winding of magnetic firing circuit MFC to bias the latter to cutoff. As a result, mixer amplifier MX of each press unit is biased to cutoff to shut off the armature supplies and stop the press unit motors.

Upon restoring as aforesaid, relay BR in FIG. 3a recloses its contact 1 to energize brake solenoid BR SOL whereby the brake is applied to stop and hold the press at standstill. Relay BR reopens its contact 2 to deenergize relay MCR, reopens its contact 3 to interrupt the maintaining circuit of relay SAICR and recloses its contact 4 to start timer SAITR running. Another contact of relay BR turns on the audible alarm in a known manner, not shown, as a warning to attendants that the press is in ready condition. Relay MCR recloses its contacts 1, 2 and 3 and reopens its contacts 4, 5 and 6.

If the inch button is pressed before three seconds have elapsed, the inching operation is repeated. If the inch button is not pressed, safe-after-inch timer SAITR times out and reopens its contact 1 to drop out safe-after-inch control relay SAICR and place the system in safe-after-inch condition as hereinbefore described. This condition would be suitably indicated by signals in known manner, not shown. If stop button NST in FIG. 3d is pressed within the three-second timed interval, a circuit is completed from supply conductor 10 in FIG. 3a through contacts 1 of relays NCR and SSR at the lower portion of FIG. 3c, supply conductor 27, stop switch NST, contacts 4 of relays SSR and NCR and resistors R1 and R2 to supply conductor 12. This lowers the voltage on relay STOP to deenergize this relay and restore its contacts. Relay STOP shuts off any ready condition signals and restores the system to a condition wherein the reset button must first be pressed before the press can be operated.

THREADING

Assuming that the system is in condition hereinbefore described with relay STOP deenergized, the reset button must be pressed to condition the system for obtaining the threading or walking speed, this being the same as inch except that it is continuous. Pressing reset button NR energizes the reset relay which energizes the stop relay, as hereinbefore described. The threading operation is obtained by pressing the inch button and then pressing the faster button before the inch button is released. When inch button NI in FIG. 3d is pressed, the system will operate as hereinbefore described to run the press at inch speed. Under this condition, the inch relay, brake relay BR, relay MCR, relay SAICR, relay HTCR and contactor M will be energized and the brake solenoid BR SOL will be deenergized.

While the press is running at inch speed, the faster button is pressed. Faster switch NF energizes increase speed relay INC in a circuit extending from supply conductor 27 through contacts 6 of relays SSR and NCR, contact 4 of relay SAICR, contact 4 of relay SAFE and limit switch RD1 to supply conductor 12. Relay INC opens its contact 1 and closes its contacts 2 and 3. Contact 1 opens a point in the circuit of advance relay ADV so that this relay will not be energized until the increase relay is restored. Contact 2 closes an energizing circuit for the run relay through contact 1 of the stop relay and contact 2 of the inch relay. And contact 3 of relay INC closes a point in the circuit of forward winding F of the speed reference pilot motor in FIG. 3a.

The aforesaid energization of the run relay in FIG. 3a causes closure of its contacts 1 through 5. Contact 1 completes a maintaining circuit for relay BR in shunt of contact 1 of the inch relay since the latter relay will be restored. Contact 2 completes a self-maintaining circuit in shunt of contact 2 of the inch relay and contact 2 of relay INC. Contact 3 of the run relay connects speed reference potentiometer P1 through rheostat RH2 to the run reference winding of magnetic firing circuit MFC and also through conductors 17 and resistor CTSG to current taper winding CT of mixer amplifiers MX. Contact 4 completes a circuit in shunt of contact 1 of the safe relay to maintain the stop relay energized independently of the safe relay. And contact 5 of the run relay completes a circuit for relay HTCR in shunt of contact 3 of the inch relay which will reopen.

After the run relay has been energized as aforesaid, inch switch NI may be released to allow it to reopen and to deenergize the inch relay. Contacts 1, 2 and 3 of the inch relay reopen without effect since relay BR, the run relay and relay HTCR are maintained by the run relay.

Both the inch reference winding and the run reference winding of magnetic firing circuit MFC are now continuously energized without having to hold any button depressed, causing unit motor UM and the other unit motors to run at the threading speed which is substantially the same as the inch speed since potentiometer P1 is at zero position. This operation of the system to threading speed is known as the one finger inch, two finger run operation and is a safety feature since the press must first be put to inch speed before it can be put to threading speed. The inch speed step can be eliminated or by-passed by shunting contact 2 of the inch relay in FIG. 3a as indicated by a dotted line.

The faster button NF can be released to allow its switch to reopen and the press will continue running at threading speed. This causes deenergization of relay INC to reclose its contact 1 and to reopen its contacts 2 and 3. Contact 2 reopens without effect as the run relay is self-maintained. Contact 1 energizes advance relay ADV which sets up the increase speed circuit, and contact 3 opens a point in the forward winding F circuit of the speed reference pilot motor to delay increase in speed until the faster button is pressed a second time.

Relay ADV closes contact 1 to complete a self-maintaining circuit through contact 2 of the run relay and contact 1 of the stop relay independently of relays INC and INCH. Relay ADV also closes contact 2 in the circuit of forward winding F to set up the increase speed circuit of the speed reference pilot motor so that it is now under the control of relay INC.

The press now runs at the threading speed and can be stopped by pressing the stop button. The speed can also be increased by pressing the faster button.

RUNNING

To run the press at a faster speed, it is first necessary to set the system in the threading condition as hereinbefore described and to release the faster button NF in FIG. 3d after the first pressing thereby to cause energization of relay ADV in FIG. 3a. After the advance relay ADV is energized and maintained, the speed can be increased to a desired running speed by pressing the faster button NF and can be decreased by pressing the slower button.

Pressing faster button NF causes energization of increase speed relay INC in a circuit extending from supply conductor 27 through switch NF in FIG. 3d, contacts 6 of relays SSR and NCR, contacts 4 of relays SAICR and SAFE and limit switch RD1 to supply conductor 12. Relay INC opens contact 1 and closes contact 2 without effect since relays ADV and RUN are maintained. Relay INC closes contact 3 to energize forward winding F of the speed reference pilot motor, causing the motor to rotate speed reference potentiometer P1 in FIG. 3c in the increase speed direction as indicated by the arrow. This increases the energization of the run reference winding of magnetic firing circuit MFC to increase the current reference output signal from the magnetic firing circuit to mixer amplifiers MX of all the press units being used. The mixer amplifiers increase their output signals to the three-phase firing circuits to advance the phase of the firing pulses relative to the positive anode voltage periods of the silicon controlled rectifiers in power bridge 3CRB. As a result, the bridge increases the applied armature voltage to increase the motor speed. The maximum motor speed is set at rheostat RH2 in FIG. 3c, the arrow indicating the direction for increasing the maximum speed.

Figure 4:
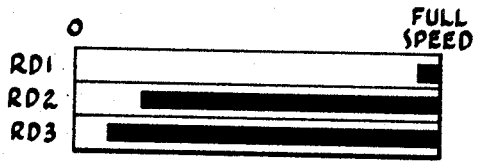
FIG. 4 is a cam layout development for the speed reference device shown in FIGS. 3a and 3c.

Let it be assumed that the pilot motor has been operated to set the speed reference potentiometer P1 from zero position to a slow speed position wherein limit switch RD3, as shown by the cam development in FIG. 4, is closed to energize relay OFF in FIG. 3b. This off relay closes its contacts 1 and 2. Contact 1 completes a point in the circuit of resistors R1 and R2 to prevent automatic restarting of the press after power failure when power is restored. To this end, if power fails, the stop relay deenergizes and among other things, closes its contact 4. When power is restored, the off relay closes its contact 1 to complete a circuit from supply conductor 10 through contact 4 of the stop relay and resistors R1 and R2 to supply conductor 12. The voltage divider consisting of resistors R1 and R2 drops the voltage on the operating coil of the stop relay so that it cannot be energized. The off relay also closes its contact 2 to close a point in the circuit of decrease speed relay DEC. This enables operation of the decrease speed relay from slower button NSL to run the speed reference device back to zero position whereby to open limit switch RD3 and restore the off relay. This opens contact 1 of the off relay to allow reenergization of the stop relay.

When the off relay energizes as aforesaid, closure of its contact 1 also prepares a circuit for dropping out the stop relay and stopping the press in response to a web break. If a web should break while the press is running, a web breaker detector in known manner, not shown, causes web relay contact WR in FIG. 3b to close. This completes a circuit from supply conductor 10 through contact 1 of the off relay to resistor R1 to deenergize the stop relay and stop the press as hereinafter more fully described in connection with emergency stop.

When the speed reference pilot motor is operated further, limit switch RD2 in FIG. 3a opens as shown by the cam development in FIG. 4 to prevent application of the mechanical brake until the speed is again reduced to a low value. When the pilot motor is operated to full speed, limit switch RD1 in FIG. 3b opens to deenergize and prevent further operation of relay INC thereby to prevent the pilot motor from rotating the speed reference potentiometer beyond its limit of travel.

When the faster button is released, the pilot motor stops and the speed of the press motors remains at the value then attained.

Pressing the slower button in FIG. 3d causes energization of decrease speed relay DEC in a circuit between supply conductors 27 and 12 extending through switch NSL, contacts 7 of relays SSR and NCR and contact 2 of relay OFF. Relay DEC opens its contact 1 to prevent concurrent energization of the forward winding, closes its contacts 2 to cause energization of reverse winding R of the pilot motor and closes its contact 3 without effect at this time since the stop relay contact 2 is open. The pilot motor now runs speed reference potentiometer P1 in the opposite direction to decrease the speed of the press unit motors. When the slower button is released, relay DEC restores its contacts to stop the pilot motor. The speed of the press unit motors remains at the value then attained.

As aforementioned, pressing the safe button to close switch NRS when the press is in ready condition but not running puts the controller in a safe condition so that the press cannot be started until the ready button is first pressed to open the switch.

On the other hand, if the press is running and switch NRS is closed, the press will continue running but the controller will go into a condition preventing increase of the press speed. This condition can be attained at any speed including threading as long as the run relay is energized. Pressing the safe button under such condition causes energization of the safe relay. The safe relay opens its contact 1 without effect since the run relay contact 4 in shunt thereof maintains the stop relay energized. The safe relay opens its contact 2 without effect, opens its contact 3 to prevent energization of the inch relay and opens its contact 4 to prevent energization of speed increase relay INC. Thus, the press will continue running but its speed cannot be increased.

As aforementioned, current limit protection for the unit motors is afforded by the saturation characteristics of magnetic firing circuit MFC since preset proportionate load division between the motors is maintained by the very fast response current feedback from each motor to its respective current regulator amplifier MX. This current limit action takes place whenever a large increase in motor current is called for. Such large increase in motor current may be called for by a rapid turning of speed setter potentiometer P1 in its increase direction or by a sudden decrease in motor speed reducing the tach feedback signal or the like. The magnetic core and windings of the magnetic firing circuit are constructed so that it saturates at a predetermined maximum output current reference value to limit the amount of current reference that can be applied therefrom to the unit motor current regulator control circuits MX. This action limits the increase in motor current to a safe value.

The maximum current reference that can be applied versus speed characteristic can be modified from a decreasing characteristic to a constant or even an increasing characteristic by the current taper signal circuit shown in FIG. 3e. As shown therein, a signal proportional to the speed reference signal is applied through conductors 17 and resistor CTSG to current taper winding CT of unit current regulator amplifier MX in each press unit. Resistor CTSG may be a signal generator or modifier or a function generator which energizes winding CT in the desired proportion as the speed setter is adjusted. Thus, the signal on winding CT is added to the signal on the reference winding of current regulator amplifier MX to give the constant or rising characteristic as desired.

STOPPING

The normal method of stopping the press is to press the slower button until the press reaches a low or threading speed and then pressing the stop button to bring the press to a halt.

When the pilot motor is run to decrease the press speed to a low value, limit switch RD2 recloses to allow application of the brake under the control of the brake relay. At a little slower press speed, the pilot motor opens limit switch RD3 to deenergize the off relay. Relay OFF opens its contact 1 to render the web relay contact WR ineffective and opens its contact 2 in the circuit of the decrease speed relay to prevent further energization of the reverse winding of the pilot motor.

If the stop button is now pressed, a circuit is completed from supply conductor 27 through stop switch NST, contacts 4 of relays SSR and NCR and resistors R1 and R2 to supply conductor 12. This lowers the voltage on the stop relay coil so that the stop relay deenergizes and at its contact 1 in FIG. 3a restores relays BR, ADV and RUN. Contact 2 of the stop relay closes a point in the circuit of the dynamic braking control relays. Contact 3 opens its own maintaining circuit. Contact 4 closes without effect at this time. Contact 5 opens the energizing circuit of relay SAICR. Contact 6 closes without effect at this time. And contact 7 opens a point in the circuit of timer SAITR.

Upon restoring as aforesaid, brake relay BR recloses its contact 1 to energize the brake solenoid and apply the brake. Relay BR reopens its contact 2 to deenergize relay MCR, reopens its contact 3 to deenergize relay SAICR and recloses its contact 4 without effect as contact 7 of the stop relay is open.

Upon restoring as aforesaid, relay ADV reopens at its contact 1 its self-maintaining circuit and reopens its contact 2 to prevent operation of the pilot motor in its forward direction.

Upon restoring as aforesaid, relay RUN reopens its contacts 1 and 2 to interrupt maintaining circuits, reopens its contact 3 to disconnect the speed reference potentiometer from the run reference winding of the magnetic firing circuit, reopens its contact 4 without effect at this time and reopens its contact 5 to restore relay HTCR.

Upon restoring as aforesaid, relay MCR recloses its contacts 1 in FIG. 3f to connect resistor R3 in shunt of capacitor C1 in the circuit of feedback winding VFB of the mixer amplifier. This increases the negative feedback to aid in shutting off the mixer amplifier. Relay MCR recloses its contact 2 to shunt resistor R5 and to shunt the output signal of the mixer amplifier from three-phase firing circuits 3FC. Relay MCR reopens its contact 3 in FIG. 3 and reopens its contact 4 in FIG. 3g to restore main contact M and reopens its contact 5 to insert resistor R14 in the shunt field circuit.

Upon restoring as aforesaid, relay SAICR in FIG. 3b recloses its contact 1 to insure that the stop relay remains restored, reopens its contact 2 in its self-maintaining circuit, reopens its contact 3 to lock out the inch relay and reopens its contact 4 to lock out the increase speed relay.

Upon restoring as aforesaid, relay HTCR opens its contact 1 in FIG. 3c to disconnect inching control potentiometer P2 from the inch reference winding of the magnetic firing circuit.

Upon restoring as aforesaid main contactor M recloses its contact 1 in FIG. 3c in the dynamic braking contactor circuit, recloses its contact 2 in FIG. 3f to shunt the input signal from the three-phase firing circuit, reopens its contact 3 without effect at this time, recloses its contact 4 in FIG. 3g to connect resistors R9 and R10 across the output of the power bridge and to apply negative feedback to the mixer amplifier via its special feedback winding, and reopens its contact 5 to disconnect armature A from the output of the power bridge. In response to these functions, the press unit motors stop.

EMERGENCY STOP

Under emergency conditions when the press must be stopped quickly without first running the speed reference potentiometer to a low value, the stop button is pressed. Also, if the web breaks, this break will be detected by a web relay and its contact WR in FIG. 3b will cause quick stopping of the press.

If the press is at running speed such that the off relay in FIG. 3b is energized, and its contact 1 closed and an emergency condition occurs, the press must be stopped quickly. This stopping may be initiated by manually closing stop switch NST or by the web break detector closing web relay contact WR. In either case, a circuit is completed from supply conductor 10 or 27 through contact WR and contact 1 of the off relay or through stop switch NST and contacts 4 of relays SSR and NCR and then through resistors R1 and R2 to supply conductor 12. This lowers the voltage to deenergize the stop relay. Alternatively, the trip contact at the lower portion of FIG. 3a may open in response to an abnormal electrical condition or jam in the press to interrupt the stop relay circuit. The stop relay opens its contact 1 to drop out relays BR, ADV and RUN, closes at its contact 2 a point in the circuit of the dynamic braking control relays, opens at its contact 3 its self-maintaining circuit, closes at its contact 4 a shunt across contact WR, opens at its contact 5 the energizing circuit of relay SAICR, closes at its contact 6 an energizing circuit for decrease speed relay DEC through contact 2 of the off relay, and opens at its contact 7 the circuit of timer SAITR.

Upon restoring as aforesaid, brake relay BR opens its contact 2 to deenergize relay MCR and deenergizes relay SAICR to close its contact 1 and prevent energization of the stop relay.

Upon restoring as aforesaid, the run relay disconnects at its contact 3 the speed reference potentiometer from the run reference winding of the magnetic firing circuit. The run relay also opens its contact 4 in the stop relay circuit and at its contact 5 deenergizes relay HTCR to disconnect the inch potentiometer P2 from the inch reference winding of the magnetic firing circuit.

Upon energizing as aforesaid, relay DEC closes its contact 2 in the reverse winding circuit of the pilot motor to start the speed reference device running back toward its zero position. Relay DEC also closes its contact 3 to energize relay 1DBCR and timer DBTR through the then closed contact 2 of the stop relay. Relay 1DBCR opens its contact 1 to insure deenergization of relay MCR, closes its contact 2 to energize the safe relay and closes its contact 3 in shunt of contact 4 of the stop relay to hold the latter deenergized. Timer DBTR starts running to time an adjustable interval at the end of which its timed closing contact closes to energize relay 2DBCR.

Upon restoring as aforesaid, relay MCR closes its contact 1 in FIG. 3f to connect resistor R5 in shunt of capacitor C1 in the circuit of winding VFB. This causes winding VFB to apply a strong negative feedback to aid in shutting off the mixer amplifier and consequently shutting off three-phase firing circuit 3FC. Relay MCR closes its contact 2 in FIG. 3f to shunt the input signal from the three-phase firing circuit. Relay MCR opens its contact 3 in FIG. 3f without effect, opens its contact 4 in FIG. 3g to restore main contactor M and opens its contact 5 to insert resistor R14 in the shunt field circuit.

Upon restoring as aforesaid, main contactor M closes at its contact 1 in FIG. 3c a point in the circuit of dynamic braking contactor DB, closes its contact 2 and opens its contact 3 in FIG. 3f without effect, closes its contact 4 in FIG. 3g to connect the special feedback winding of the mixer amplifier to the output of power bridge 3CRB and opens its contact 5 to disconnect armature A from the power bridge output. The special feedback winding applies negative feedback to the mixer amplifier to aid in turning it off.

When timer DBTR times out and energizes relay 2DBCR, the latter closes its contact in FIG. 3a to energize dynamic braking contactor DB. The circuit for the latter extends through contact 2 of the stop relay in FIG. 3a, contact 3 of relay DEC, the contact of relay 2DBCR, contact 3 of relay SR and contact 1 of main contactor M. Contactor DB opens its interlock contact 1 in the circuit of relay MCR, closes its contact 2 in FIG. 3g to connect dynamic braking resistor R13 across the armature and closes its contact 3 in a shunt circuit for resistor R14.

It will be apparent that under running conditions, dynamic braking voltage relay DBVR is energized to open its contact. When relay MCR inserts resistor R14 in the field circuit and contactors M and DB apply dynamic braking the voltage generated by the rotating armature maintains relay DBVR energized. Resistor R14 and relay DBVR afford more linear dynamic braking. Insertion of resistor R14 in series with the shunt field causes weakening of the field and a softer initial application of the braking effect for a first braking period. As the armature voltage decreases, a stronger field is required to provide the proper braking effect. For this purpose, voltage relay DBVR deenergizes when the armature voltage decreases to a predetermined value and closes its contact to shunt resistor R14 from the field circuit. Full field now is applied to afford more linear braking effect during the second braking period. This provides a more nearly linear deceleration of the press during stopping.

Resistor R14 also performs a field economizing function when the press is not running. It will be apparent that the field is energized whenever circuit breaker CB is closed. At such time, contact 5 of relay MCR and contact 3 of contactor DB are open to maintain resistor R14 in series with field winding SF.

Continuing with the description of emergency stopping, it will be recalled that dynamic braking now is being applied and the speed reference device is being run in the reverse direction toward zero position. When the speed reference device approaches zero position, limit switch RD2 in FIG. 3a closes to energize the brake solenoid and apply the mechanical brake to stop and hold the press. Limit switch RD3 then opens to restore the off relay in FIG. 3b. The off relay opens its contact 1 to interrupt the stop relay restoring circuit and opens its contact 2 to deenergize relay DEC. The decrease speed relay recloses its contact 1 to permit forward operation of the pilot motor, opens its contact 2 to stop reverse operation of the pilot motor and opens its contact 3 to restore relays 1DBCR, 2DBCR and timer DBTR. As a result, relay 2DBCR restores contactor DB.

SPECIAL INCH FUNCTION

Certain units of the press such as the color deck unit may be provided with a special inch circuit like that shown at the lower portion of FIG. 3c and the right-hand portion of FIG. 3d. The purpose of such circuit is to allow inching operation of the color press unit independently of the other press units and the folder.

For special inch operation, unit selector switch USS at the lower left-hand portion of FIG. 3c is placed in its special inch position to open contacts 1 and 2 and to close contact 3 thereof. The unit selector switches of the other press units may be turned off so that they will not be operated. The clutch associated with the color deck unit may be left disengaged to disconnect the color deck unit from the common driven mechanism.

Transfer relay SSL and special inch control relays SICR are energized through contact 3 of the unit selector switch. Relay SICR closes its contacts 1 and 2 to connect supply conductors 18 and 20 to conductors 28 and 30, respectively. Relay SICR also closes its contacts 3 and 4 in FIG. 3f to prepare a control circuit for the reference winding of mixer amplifier MX. Relay SICR further closes its contact 5 in FIG. 3g to connect voltage divider resistors R9 and R10 in series across the output of the power bridge since contact 4 of the contactor M will be opened as hereinafter described. Relay SSL closes its contacts 1 through 6. Contact 1 connects supply conductor 30 to conductor 27 since contact 1 of relay SSR is now open. Contact 2 of relay SSL connects ready-safe switch NRS to the safe-X relay. In a similar manner, contacts 3–6 of relay SSL connect the reset, stop, inch and faster switches to the special inch circuit. As will be apparent, these connections enable operation of the special inch circuit from the set of normal operation buttons.

Switch NRS in FIG. 3d must be in its ready position to allow operation of the special inch circuit. If switch NRS is placed in its safe position, safe-X relay is operated to open its contact and interrupt the circuit of the stop-X relay. This prevents operation of the special inch circuit.

When switch NRS is in its ready position with its contact open, reset switch NR is pressed momentarily to cause momentary energization of the reset-X relay. The reset-X relay closes its contact 1 to energize safe-after-inch timer SAITR-X which closes its contact in the stop-X relay maintaining circuit. The reset-X relay also closes its contact 2 to energize the stop-X relay through the contact of the safe-X relay. As indicated in FIG. 3d, the timer contact is instantaneous closing and timed opening. Therefore, this contact closes when the reset switch is pressed and remains closed for a timed interval. The stop-X relay, when energized as aforesaid, closes its contact 1 to maintain itself through the timer contact and the safe-X relay contact. The stop-X relay also closes its contact 2 to close a point in the inch-X relay circuit and closes its contact 3 to close a point in the HOLD relay circuit.

When the reset switch is released to reopen, the reset-X relay reopens its contacts 1 and 2. Timer SAITR-X now maintains the stop-X relay energized for a short time interval during which time the inch button must be pressed. Otherwise, the timer will restore the stop-X relay to put the system in safe condition requiring reoperation of the reset switch.

Pressing the inch switch during the timed interval causes energization of the inch-X relay to close its contacts 1, 2 and 3. Contact 1 closes a circuit in shunt of contact 1 of the reset-X relay for maintaining timer SAITR-X energized so the reset switch can be released to reopen. Contact 2 energizes relay MCR through contacts 1 of the test relay and contactor DB and contact 3 completes a point in a maintaining circuit for relay inch-X.

Relay MCR opens its contacts 1 and 2 in FIG. 3f to insert capacitor C1 in series with winding VFB and to insert resistor R5 across the input signal circuit of the three-phase firing circuit. Relay MCR closes its contact 3 in FIG. 3f to connect the resistor of potentiometer P4 across direct current supply conductors 36 and 38 and to energize the reference winding of the mixer amplifier through contacts 8 and 9 of relay SR. Relay MCR also closes its contacts 4 and 5 in FIG. 3g to energize contactor M and to shunt resistor R14 from the field circuit. Contactor M opens its contact 1 in FIG. 3c, opens its contact 2 in FIG. 3f to unshunt the input signal of the three-phase firing circuit, closes its contact 3 without effect at this time, opens its contact 4 in FIG. 3g and closes its contact 5 to connect the motor armature to the output of the power bridge.

The aforementioned functions cause the unit motor to start running at inching speed. The motor speed may be manually adjusted at potentiometer P4 in FIG. 3f. As will be apparent, turning this potentiometer in the increase direction of the arrow enchances the energization of the reference winding of the mixer amplifier to increase the output of the mixer amplifier. This controls the three-phase firing circuit to advance the phase of the firing pulses relative to the positive anode voltage periods of the silicon controlled rectifiers in the power bridge to increase the armature voltage.

Since the color deck unit has been declutched from the other units, it is seen from FIG. 1 that the tachometer generator is at a stanstill and will provide no speed feedback signal. Moreover, since the magnetic firing circuit MFC is not being used, any tachometer signal would have no effect anyway. For this reason, the special feedback winding of the mixer amplifier is energized from the output of the power bridge and provides a negative feedback signal in place of the tachometer feedback signal. This negative feedback signal is proportional to the armature voltage and, therefore, regulates and stabilizes the armature voltage.

In order to maintain inching operation without having to hold the inch button down, the faster button must be pressed before the inch button is released. This causes energization of the hold relay which closes its contact to complete a self-maintaining circuit and a maintaining circuit for the inch-X relay. The faster button may then be released to reopen.

To stop the special inching operation, stop button NST is pressed to connect resistors R1-X and R2-X through contact 4 of the relay SSL across the supply conductors 27 and 28. This lowers the voltage on the operating coil to restore the stop-X relay. This causes restoration of the inch-X and hold relays. The inch-X relay restores relay MCR and the latter restores contactor M to stop the motor as hereinbefore described.

TESTING THE CONTROL SYSTEM

For testing operability of the control system without running the press unit motors, test-normal switches TN1 and TN2 in FIG. 3a are placed in their test position and circuit breaker CB in FIG. 3f and corresponding circuit breakers in the other press units are opened to disconnect power from the units and to close interlock contact CB1 in FIG. 3c and corresponding contacts in the other press units. These circuit breakers disconnect power from the unit mixer amplifiers, the three-phase firing circuits and the controlled power bridges. Switch TN1 contact 2 closes a point in the circuit of the test relay and contact 1 opens a point in the circuit of relay MCR. This switches control of relay MCR from relay BR to the test relay. Switch TN2 activates the set of test control pushbutton switches shown at the lower left-hand portion of FIG. 3a and the left-hand portion of FIG. 3b and by-passes the trip switch. For this purpose, contact 1 of switch TN2 connects supply conductor 10 to test control ready-safe switch TRS, reset switch TR, stop switch TST, inch switch TI, faster switch TF and slower switch TSL. Contact 2 of switch TN2 shunts the trip switch to allow energization of the stop relay independently of the trip apparatus even if a jam or the like holds the trip contact open.

Each clutch is left engaged so that limit switch LS energizes relay PAR. Each unit selector switch is in its on position so that set-up relays SR and SSR are energized. Switch NOS is in its normal position so that relay NCR is energized. In other words, the system is put in the same condition as it is for inching and running with the aforementioned differences in the positions of test-normal switches TN1 and TN2 and the unit motor circuit breaker.

It will be apparent from the foregoing that the controller can now be operated for test purposes from either the set of test control pushbuttons or the normal operation pushbuttons. This could alternatively be done from the set of standby pushbuttons if provided depending upon the position of switch NOS in FIG. 3a.

If either ready-safe switch TRS or NRS is now placed in the safe position, the safe relay will establish a safe condition as hereinbefore described wherein the control system is locked out so that it cannot be operated. If the control system is in its test-running condition when one of these switches is placed in its safe position, the safe relay will lock out the increase relay INC so that the pilot motor cannot be operated in the forward direction.

When the ready-safe switches are put back in their ready position, a reset switch TR or NR must first be pressed to condition the control system so that it can be tested for inching, threading and running. Momentary closure of the reset switch momentarily energizes the reset relay to energize the stop relay which is held. These test functions will be stated generally since they are like the corresponding functions hereinbefore described except that the press unit motor controls beyond circuit breaker CB are not energized. The stop relay energizes safe-after-inch control relay SAICR and starts safe-after-inch timer SAITR.

Pressing either inch button TI or NI before the timer times out energizes the inch relay. The inch relay energizes the brake relay BR which is held and energizes control relay HTCR. Brake relay BR deenergizes the brake solenoid to release the brake, assuming that the speed reference potentiometer is at or near zero position and limit switch RD2 is closed. The brake relay also at its contact 2 in FIG. 3a completes an energizing circuit for the test relay through contact 1 of relay 1DBCR, contact 2 of test-normal switch TN1, contact 5 of relay SR, contact 2 of relay PAR and circuit breaker interlock contact CB1. The test relay disconnects at its contact 1 the special inch circuit from the coil of relay MCR and at its contact 2 connects the coil of relay MCR in parallel with its own coil to energize relay MCR through contact 1 of contactor DB. Relay BR also maintains relay SAICR and interrupts timer SAITR. When the inch button is released and opened, the aforementioned relays that are dependent for their operation thereon restore.

If either one of the faster buttons is pressed before the inch button is released, a run test is performed on the controller. The faster switch energizes speed increase relay INC which energizes the run relay. The inch button may now be released to deenergize the inch relay since the run relay maintains itself and relays BR and HTCR. When the faster button is released to reopen, relay INC deenergizes to energize relay ADV which prepares the pilot motor for forward operation on subsequent depressions of the faster button. For this purpose, relay ADV maintains itself independently of relay INC and closes its contact 2 in the circuit of forward winding F of the pilot motor. Pressing the faster button a second time reenergizes relay INC which closes its contact 3 to energize forward winding F of the pilot motor. The pilot motor now runs and rotates speed reference potentiometer P1 in the increase direction of the arrow as long as the faster button is pressed.

When potentiometer P1 is driven from zero position, limit switch RD3 closes according to the cam development in FIG. 4. Limit switch RD3 energizes the off relay in FIG. 3b which closes its contact 1 in the release circuit of the stop relay and closes its contact 2 to prepare decrease speed relay DEC for operation from one of the slower buttons.

When the speed reference potentiometer is driven a little further, limit switch RD2 opens to maintain the brake solenoid deenergized so that the brake cannot be applied. If the speed reference device is driven to full speed, limit switch RD1 opens to deenergize relay INC and prevent further forward operation of the pilot motor.

POWER TEST

The test hereinbefore described involved testing only the control circuits. An additional test can be conducted is the power test or test of the motor power circuits beyond circuit breaker CB without actually running the motors.

For this test, test-normal switches TN1 and TN2 in FIG. 3a are placed in their test position, the same as in connection with the controller test hereinbefore described. In addition, power test-normal switches TN3 and TN4 in FIGS. 3c and 3f, respectively, are placed in their test position.

Switch TN1 opens a point in the circuit of relay MCR and closes a point in the circuit of the test relay. Switch TN2 connects power to the set of test control pushbuttons so that either the test control pushbuttons or the normal operation pushbuttons can be used to perform the power test and by-passes the trip contact. Switch TN3 in FIG. 3c closes a point in the test relay circuit in shunt of circuit breaker interlock contact CB1 since this contact will open when the circuit breaker is closed. Switch TN4 in FIG. 3f at its contact 1 opens a shunt across the signal input conductors of the three-phase firing circuit. Contact 2 of switch TN4 closes a point in another shunt circuit across the signal input conductors of the three-phase firing circuit which will shunt the input signal from the latter if someone should close main contactor M. And contact 3 opens to prevent energization of main contactor M.

Circuit breaker CB in FIG. 3f is now closed to render the system ready for a power test. Closing the circuit breaker opens its contact CB1 in FIG. 3c without effect since it is by-passed by switch TN3.

Pressing one of the reset buttons TR or NR momentarily in FIG. 3a or 3d energizes the reset relay which in turn energizes the stop relay. The stop relay maintains itself, energizes relay SAICR and starts timer SAITR. Pressing an inch button TI or NI before the timer times out energizes the inch relay. The inch relay energizes brake relay BR in FIG. 3a and energizes control relay HTCR in FIG. 3b. The brake relay deenergizes the brake solenoid to release the brake, energizes the test relay in FIG. 3c, maintains relay SAICR and interrupts the safe-after-inch timer SAITR. The test relay energizes relay MCR.

Energization of the inch reference winding of magnetic firing circuit MFC by relay HTCR causes the firing circuit to operate controlled bridge 1CRB to energize the reference winding of mixer amplifier MX. As a result, the mixer amplifier provides an output signal. Relay MCR opens its contact 1 in FIG. 3f to insert capacitor C1 in the circuit of winding VFB, opens its contact 2 to unshunt resistor R5 in the mixer amplifier output and closes its contact 3 in FIG. 3f without effect at this time. Relay MCR also closes its contact 4 in FIG. 3g without effect since contact 3 of switch TN4 maintains the circuit of contactor M open. Relay MCR further closes its contact 5 in FIG. 3g to shunt resistor R14 from the field circuit.

The output of the mixer amplifier now operates three-phase firing circuit 3FC and the latter operates power bridge 3CRB. It will be apparent that the motor armature is left disconnected and contact 4 of main contactor M maintains resistors R9 and R10 connected across the output of the power bridge as a small load. The bridge output voltage may be observed on voltmeter V. The special feedback winding of the mixer amplifier is energized across resistor R9 to provide some regulating negative feedback to the mixer amplifier since neither current feedback to winding IFB of the mixer amplifier or speed feedback from the tach to the magnetic firing circuit is available during the power test.

The system can now be tested for threading operation by pressing a faster button while the inch button is held down. The first pressing and release of the faster button causes relay INC to energize the run and advance relays. The run relay maintains energization of the inch reference winding and energizes the run reference winding of the magnetic firing circuit indicative of a threading speed substantially the same as the inch speed.

To test the system for running conditions, the faster button is pressed a second time to cause relay INC to run the pilot motor in the forward direction. This increases the output of the power bridge by increasing the energization of the run reference winding of the magnetic firing circuit. This increased output of the power bridge can be observed on voltmeter V. The reading obtained on the voltmeter during a test will not be the same as the reading obtained during an actual running operation. This is due to the fact that neither tachometer feedback or motor current feedback are available to hold the output down. However, by operating the pilot motor from the faster and slower buttons through a small range of increase and decrease, it can be determined from the voltmeter whether or not the power bridge goes on and off with the speed reference device.

While the system hereinbefore described is effectively adapted to fulfill the objects stated, it is to be understood that we do not intend to confine our invention to the particular preferred embodiment of plural-motor control system disclosed, inasmuch as it is susceptible of various modifications without departing from the scope of the appended claims.

We claim:
1. In a system supplied from an electric power source for controlling a plurality of direct current motors which may be coupled to a common driven device to provide a plural-unit drive, the combination comprising:
   individual unit motor control circuits for respective unit motors, each comprising a unit motor current regulator circuit;
   a common control circuit for applying a current reference signal indicative of speed error to said unit motor current regulator circuits to cause the latter to control the currents and torques of the motors so as to reduce speed error to a minimum;
   means for presetting a desired load division for the unit motors;
   means individual to each unit motor for deriving a continuous current feedback signal proportional to the torque in the respective motor and applying said feedback signal to the respective unit motor current regulator circuit to maintain the preset proportionate load division of the motors;
   and means for providing current limit protection for the motors by limiting the amount of current reference signal that can be applied to the unit motor current regulator circuits and comprising:
   means whereby the maximum value of said limited current reference signal can be modified as a function of drive speed setting.

2. The invention defined in claim 1, wherein said means whereby the maximum value of said limited current reference signal can be modified comprises:
   means whereby said maximum value of said limited current reference signal can be held constant.

3. The invention defined in claim 1, wherein said means whereby the maximum value of said limited current reference signal can be modified comprises:
   means whereby said maximum value of said limited current reference signal can be varied as a function of drive speed setting in order to provide tapering of maximum motor current with respect to drive speed.

4. In a system supplied from an electric power source for controlling a plurality of direct current motors which may be coupled to a common driven device, the combination comprising:
   individual motor control circuits for the respective motors comprising motor current regulator circuits;
   a common control circuit for controlling all of the individual motor control circuits;
   means in said common control circuit for applying current reference signals as a function of speed error to all of said motor current regulator circuits to cause the latter to control the currents and torques of the motors to reduce speed error to a minimum;
   and means for providing preset load division for the motors and current regulation for each motor comprising:
   means individual to each motor for deriving a continuous current feedback signal proportional to the torque in the respective motor and applying said feedback signal to the respective individual motor current regulator circuit to maintain the preset proportionate load division of the motors and to provide current regulation for the respective motor.

5. The invention defined in claim 4, wherein said common control circuit comprises:
means for providing current limit action by limiting the amount of current reference signal that can be applied therefrom to each motor current regulator circuit.

6. The invention defined in claim 5, wherein said common control circuit also comprises:
means for modifying the maximum value of said limited current reference signal as a function of desired motor speed setting in order to provide the desired variation of maximum motor current with respect to motor speed.

7. The invention defined in claim 4, wherein each said individual motor control circuit comprises:
a solid state controlled rectifier bridge circuit for supplying voltage to the motor armature winding;
a firing circuit for controlling the rectifiers in said bridge in synchronism with their anode voltages;
and said motor current regulator circuit comprising a mixer amplifier for receiving the current reference signal from said common control circuit to provide an output signal to said firing circuit and for modifying said output signal in accordance with said motor current feedback signal.

8. The invention defined in claim 4, wherein said common control circuit comprises:
a solid state controlled rectifier bridge circuit for developing current reference signals for all the individual motor current regulator circuits;
a firing circuit for controlling the rectifiers in said bridge in synchronism with their anode voltages;
means for applying an inch current reference signal to said firing circuit to cause it to control said rectifier bridge and to run the motors at a slow inch speed.

9. The invention defined in claim 8, wherein said common control circuit also comprises:
means for additionally applying a run current reference signal to said firing circuit to cause it to control said rectifier bridge and to run the motors at a faster threading speed.

10. The invention defined in claim 9, wherein said common control circuit further comprises:
means for changing the magnitude of said run current reference signal to increase the speed of the motors to a desired running speed.

11. The invention defined in claim 10, wherein said common control circuit additionally comprises:
means for initiating emergency stopping of the motors;
and means responsive to operation of said emergency stopping means for applying plural-step dynamic braking to the motors comprising:
means for reducing the field excitation of the motor for a first period to soften the initial braking effect;
and means for establishing full field excitation when the generated voltage of the motor armature has decreased to a predetermined value thereby to afford more linear braking effect for a second period.

12. The invention defined in claim 11, wherein each individual motor control circuit comprises:
means responsive to operation of said stopping control means for applying a strong negative feedback signal to said mixer amplifier to aid in shutting off its output.

13. In a system for controlling a plurality of direct current motors which may be coupled to a common driven device, the combination comprising:
an electrical power source;
motor current regulator circuits individual to the respective motors connected to said source;
a speed setter control circuit common to the motor current regulator circuits;
means in said common speed setter control circuit for deriving an adjustable speed reference signal;
means for deriving a speed feedback signal;
means for using said speed feedback signal to modify said speed reference signal to produce a speed error signal and for applying said speed error signal to said motor current regulator circuits to control the currents and torques of the motors;
and means individual to each motor for deriving a continuous current feedback signal proportional to the torque in the respective motor and for applying said continuous feedback signal to the respective motor current regulator circuit to maintain a preset proportionate load division among the motors when the number of motors connected in the system is changed.

14. The invention defined in claim 13, wherein
each said individual motor current regulator circuit comprises a circuit breaker for disconnecting the electrical power source therefrom;
selector switch means for placing said common control circuit in test condition;
and means effective when said common control circuit is in its test condition for affording operation thereof to test the same without operation of the individual motor current regulator circuits.

15. The invention defined in claim 14, wherein:
each said individual motor current regulator circuit comprises second selector switch means for placing the same in power test condition thereby to prevent connection of each motor armature winding to its associated motor current regulator circuit;
a meter connected to each individual motor current regulator circuit in place of the motor armature winding;
and means effective when said common control circuit is in its test condition and said individual motor current regulator circuits are in their power test condition and said circuit breaker is closed for affording operation of the individual motor current regulator circuits and for indicating the test results on the respective meters.

16. The invention defined in claim 13, wherein at least one of said individual motor current regulator circuits comprises:
a special inch control circuit for affording inching operation of the one motor associated therewith independently of the other motors;
a clutch for disconnecting said one motor from the other motors;
a selector switch for placing said one motor current regulator circuit in its special inch condition and to connect said special inch control circuit to said common control circuit;
and means in said common control circuit for operating said special inch control circuit to cause inching operation of said one motor while the other motors are at standstill.

17. The invention defined in claim 16, wherein said speed feedback signal deriving means is ineffective during special inch operation since said one motor is decoupled therefrom;
and said one motor current regulator circuit comprises means for deriving a special feedback signal proportional to the applied motor armature voltage and for applying the same to said common control circuit in place of the speed feedback signal which is not available.

18. The invention defined in claim 13, wherein:
each said individual motor current regulator circuit comprises a circuit breaker for disconnecting the electrical power source therefrom;

said common control circuit comprising a group of normal operation pushbutton switches normally operable to control the motors and a group of test control pushbutton switches normally ineffective;

selector switch means for placing said common control circuit in test condition;

and means effective when said common control circuit is in its test condition for affording operation thereof from either the normal operation pushbutton switches or the test control pushbutton switches at different locations.

References Cited

UNITED STATES PATENTS

| | | | |
|---|---|---|---|
| 1,631,752 | 6/1927 | Merrill | 318—99 |
| 2,683,246 | 7/1954 | Priban | 318—98 X |
| 2,752,545 | 6/1956 | Halter | 318—99 X |
| 2,802,952 | 8/1957 | Fairweather | 307—57 |
| 2,988,683 | 6/1961 | Pell | 318—99 |
| 3,109,130 | 10/1963 | Cheng et al. | 318—99 X |
| 3,132,295 | 5/1964 | Black | 318—163 |
| 3,189,807 | 6/1965 | Rosa et al. | 318—98 |

ORIS L. RADER, *Primary Examiner.*

B. A. COOPER, *Assistant Examiner.*